United States Patent
Maki et al.

(10) Patent No.: US 9,144,935 B2
(45) Date of Patent: Sep. 29, 2015

(54) METHOD FOR PRODUCING STRETCHED FILM, METHOD FOR PRODUCING FILM, AND FILM

(75) Inventors: Haruhiko Maki, Hyoto (JP); Kenji Ueshima, Kobe (JP); Shiro Masuda, Kashihara (JP); Shinji Ikoma, Nara (JP); Takatsugu Nakagami, Yamatotakada (JP)

(73) Assignee: KANEKA CORPORATION, Osaka (JP)

( * ) Notice: Subject to any disclaimer, the term of this patent is extended or adjusted under 35 U.S.C. 154(b) by 605 days.

(21) Appl. No.: 12/810,085

(22) PCT Filed: Dec. 26, 2008

(86) PCT No.: PCT/JP2008/073805
§ 371 (c)(1),
(2), (4) Date: Aug. 4, 2010

(87) PCT Pub. No.: WO2009/084661
PCT Pub. Date: Jul. 9, 2009

(65) Prior Publication Data
US 2011/0039084 A1 Feb. 17, 2011

(30) Foreign Application Priority Data

Dec. 27, 2007 (JP) .................................. 2007-336377
Oct. 27, 2008 (JP) .................................. 2008-275767

(51) Int. Cl.
*B29C 55/08* (2006.01)
*B29C 55/18* (2006.01)
(Continued)

(52) U.S. Cl.
CPC .................. *B29C 55/18* (2013.01); *B29C 55/08* (2013.01); *B29C 55/20* (2013.01); *B29C 53/28* (2013.01);
(Continued)

(58) Field of Classification Search
None
See application file for complete search history.

(56) References Cited

U.S. PATENT DOCUMENTS 1,736,686 A * 11/1929 Williams .......................... 26/93
2,103,205 A * 12/1937 Myers .......................... 427/369
(Continued)

FOREIGN PATENT DOCUMENTS

JP         60-248334 A     12/1985
JP          4-230704 A      8/1992
(Continued)

OTHER PUBLICATIONS

Notification of Transmittal of Translation of the International Preliminary Report on Patentability (Form PCT/IB/338) of International Application No. PCT/JP2008/073805 mailed Aug. 19, 2010 with Forms PCT/IB/373 and PCT/ISA/237.
(Continued)

*Primary Examiner* — Jeffrey Wollschlager
(74) *Attorney, Agent, or Firm* — Westerman, Hattori, Daniels & Adrian, LLP

(57) ABSTRACT

A film stretched uniaxially in the transverse direction selectively is obtained by preventing a phenomenon that the film is stretched also in the longitudinal direction in stretching the film in a direction transverse to the conveying direction.
A film F is stretched in the transverse direction while being gripped with clips 2 each having a corrugated upper teeth part (holding member piece) 12 and a corrugated lower teeth part (holding member piece) 11. Furthermore, the film F is shaped into a wavy form using corrugated gripping members 6a and 6b and stretched in the transverse direction while being held with the clips 2 having the holding members.

18 Claims, 22 Drawing Sheets

(51) Int. Cl.
  *B29C 55/20* (2006.01)
  *B32B 5/00* (2006.01)
  *B29C 53/28* (2006.01)
  *B29K 29/00* (2006.01)

(52) U.S. Cl.
  CPC .......... *B29C 53/285* (2013.01); *B29K 2029/04* (2013.01); *B32B 2307/40* (2013.01); *B32B 2307/514* (2013.01)

(56) References Cited

U.S. PATENT DOCUMENTS

| | | | | |
|---|---|---|---|---|
| 2,335,313 A * | 11/1943 | Morris et al. | ................ | 264/282 |
| 2,489,275 A * | 11/1949 | Dungler | ............. | 26/93 |
| 2,961,735 A * | 11/1960 | Mohring | ............. | 26/86 |
| 3,501,565 A * | 3/1970 | Kalwaites et al. | ............. | 264/287 |
| 3,670,375 A * | 6/1972 | Cohn et al. | ............. | 26/51.3 |
| 3,744,952 A * | 7/1973 | Bequet et al. | ................ | 425/336 |
| 3,789,468 A * | 2/1974 | Takasaki | ............. | 26/93 |
| 3,834,853 A * | 9/1974 | Bequet et al. | ................ | 425/336 |
| 3,985,599 A * | 10/1976 | Lepoutre et al. | ............. | 156/164 |
| 4,116,892 A * | 9/1978 | Schwarz | ............. | 521/62 |
| 4,153,663 A * | 5/1979 | Vetter et al. | ................ | 264/286 |
| 4,153,664 A * | 5/1979 | Sabee | ............. | 264/280 |
| 4,223,059 A * | 9/1980 | Schwarz | ............. | 428/198 |
| 4,232,434 A * | 11/1980 | Pfister | ............. | 26/86 |
| 4,368,565 A * | 1/1983 | Schwarz | ............. | 26/99 |
| 4,374,690 A * | 2/1983 | Canterino et al. | ............. | 156/229 |
| 4,448,582 A * | 5/1984 | Johnson | ............. | 8/149.1 |
| 4,717,520 A * | 1/1988 | Angella et al. | ............. | 264/147 |
| 5,028,289 A * | 7/1991 | Rasmussen | ............. | 156/229 |
| 5,324,475 A * | 6/1994 | Okahashi et al. | ............. | 264/555 |
| 6,265,045 B1 * | 7/2001 | Mushaben | ............. | 428/77 |
| 6,270,610 B1 * | 8/2001 | Benoit et al. | ............. | 156/220 |
| 2002/0089087 A1 * | 7/2002 | Mushaben | ............. | 264/288.4 |
| 2004/0041968 A1 | 3/2004 | Otoshi et al. | | |
| 2006/0028601 A1 * | 2/2006 | Kawahara et al. | ............. | 349/117 |
| 2007/0082188 A1 * | 4/2007 | Rasmussen | ............. | 428/300.7 |
| 2007/0267127 A1 | 11/2007 | Otoshi et al. | | |

FOREIGN PATENT DOCUMENTS

| | | |
|---|---|---|
| JP | 5-11111 A | 1/1993 |
| JP | 5-11114 A | 1/1993 |
| JP | 5-288931 A | 11/1993 |
| JP | 5-288932 A | 11/1993 |
| JP | 6-148428 A | 5/1994 |
| JP | 6-160623 A | 6/1994 |
| JP | 6-235816 A | 8/1994 |
| JP | 2004-145282 A | 5/2004 |
| JP | 2005-104081 A | 4/2005 |
| JP | 2007-098782 A | 4/2007 |
| JP | 2007-210281 A | 8/2007 |
| JP | 2008-268668 A | 11/2008 |

OTHER PUBLICATIONS

International Search Report of PCT/JP2008/073805, maling date of Mar. 24, 2009.

* cited by examiner

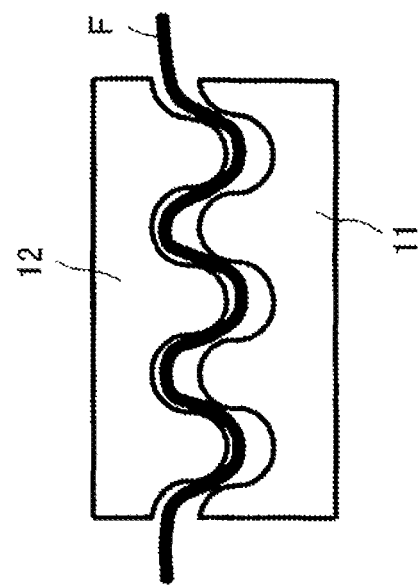
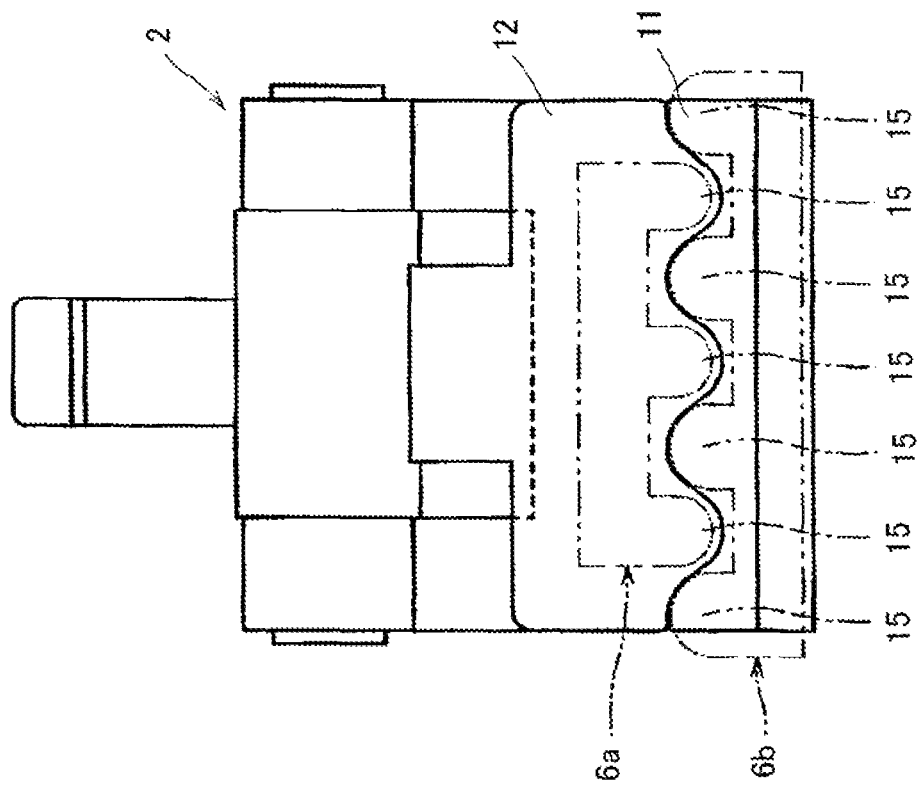

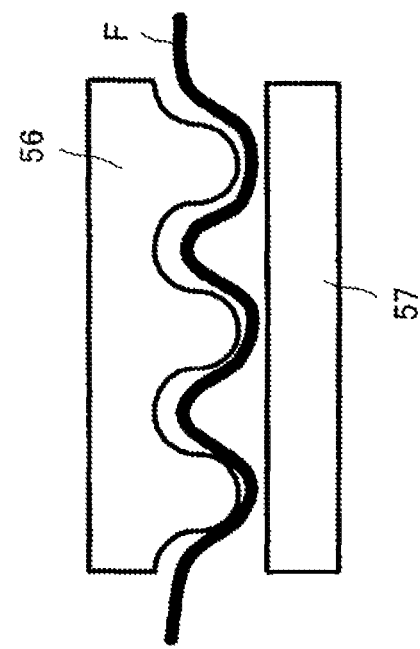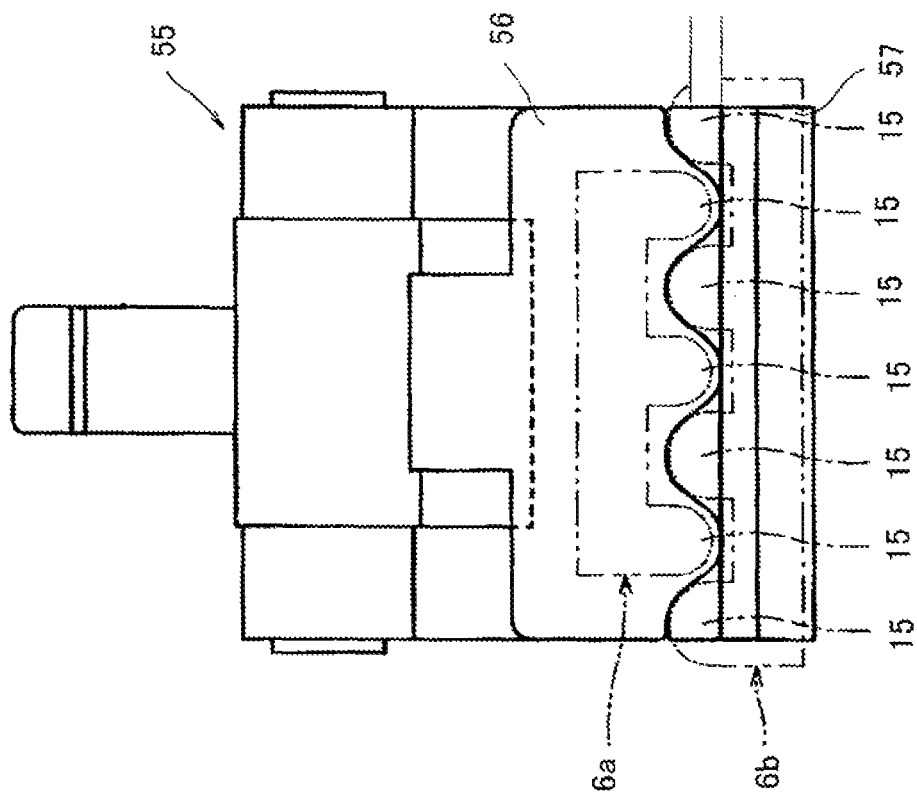

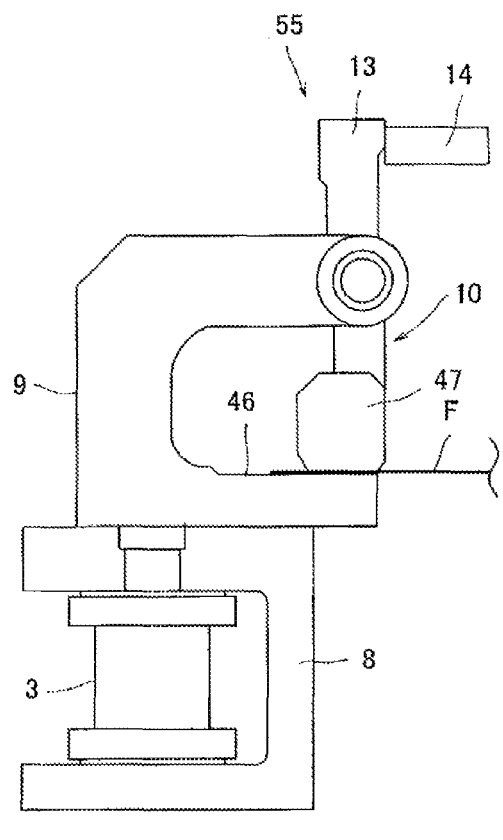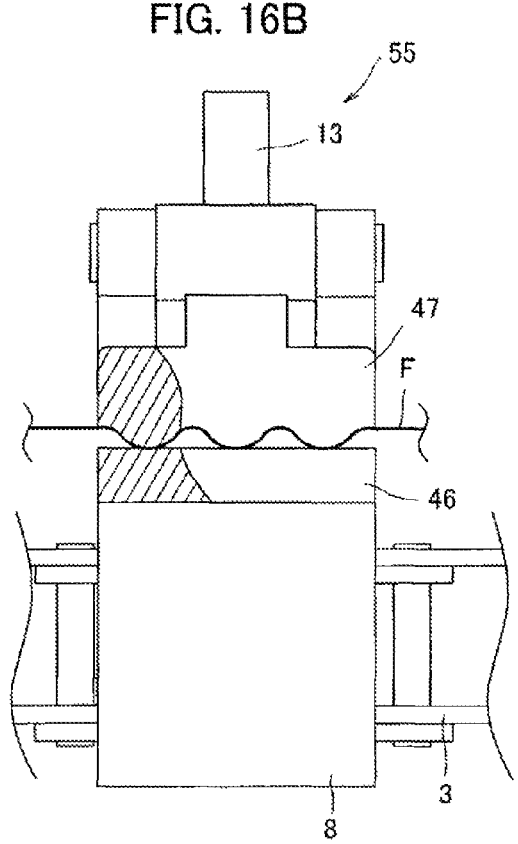

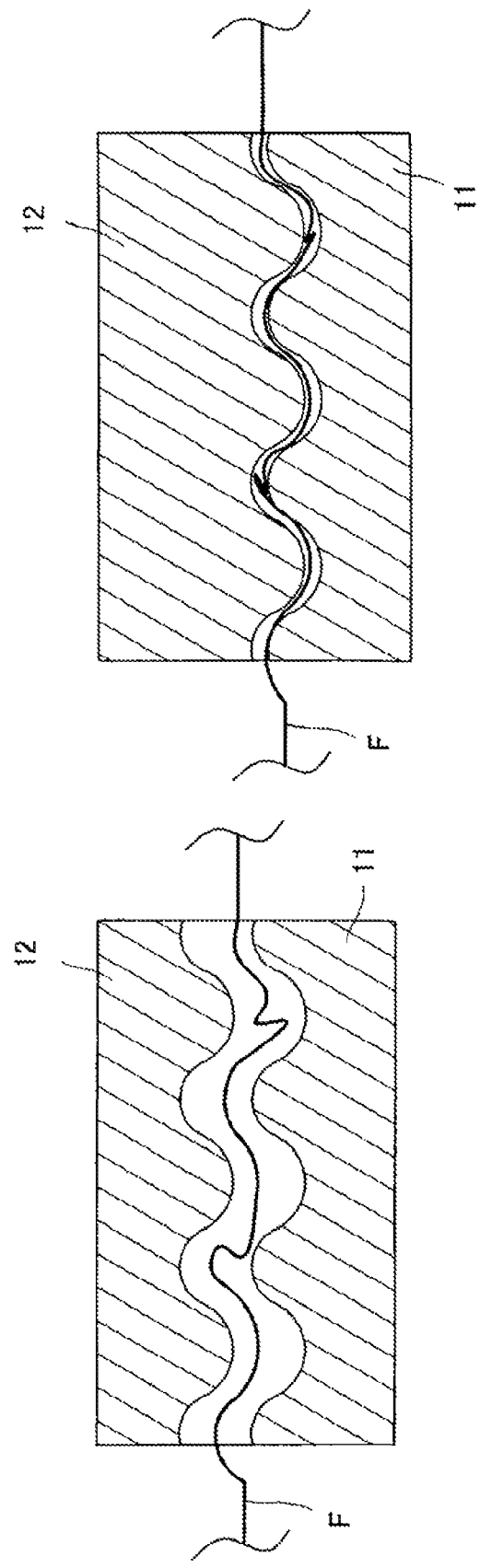

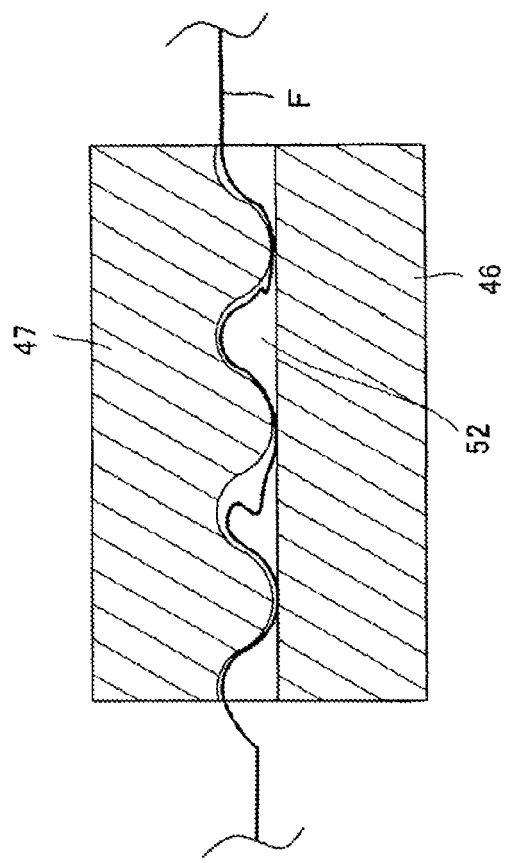
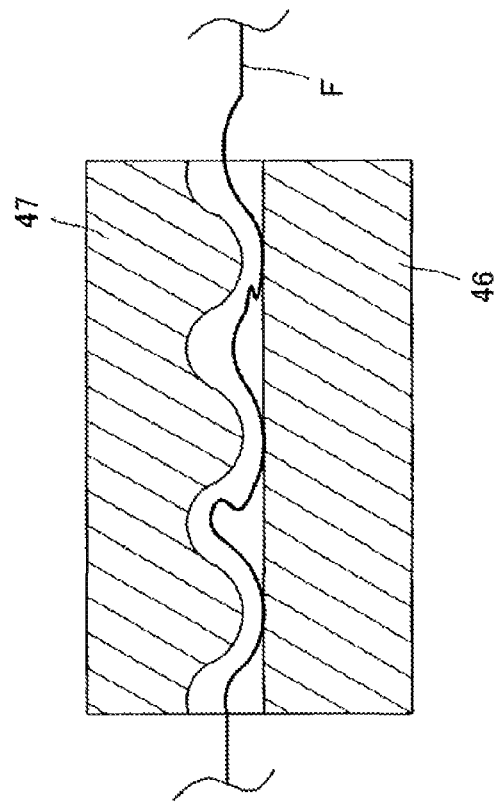

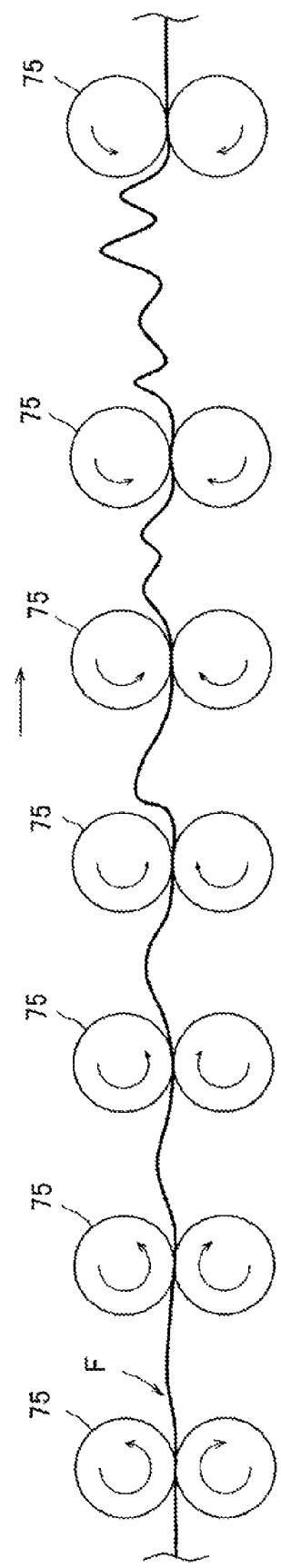

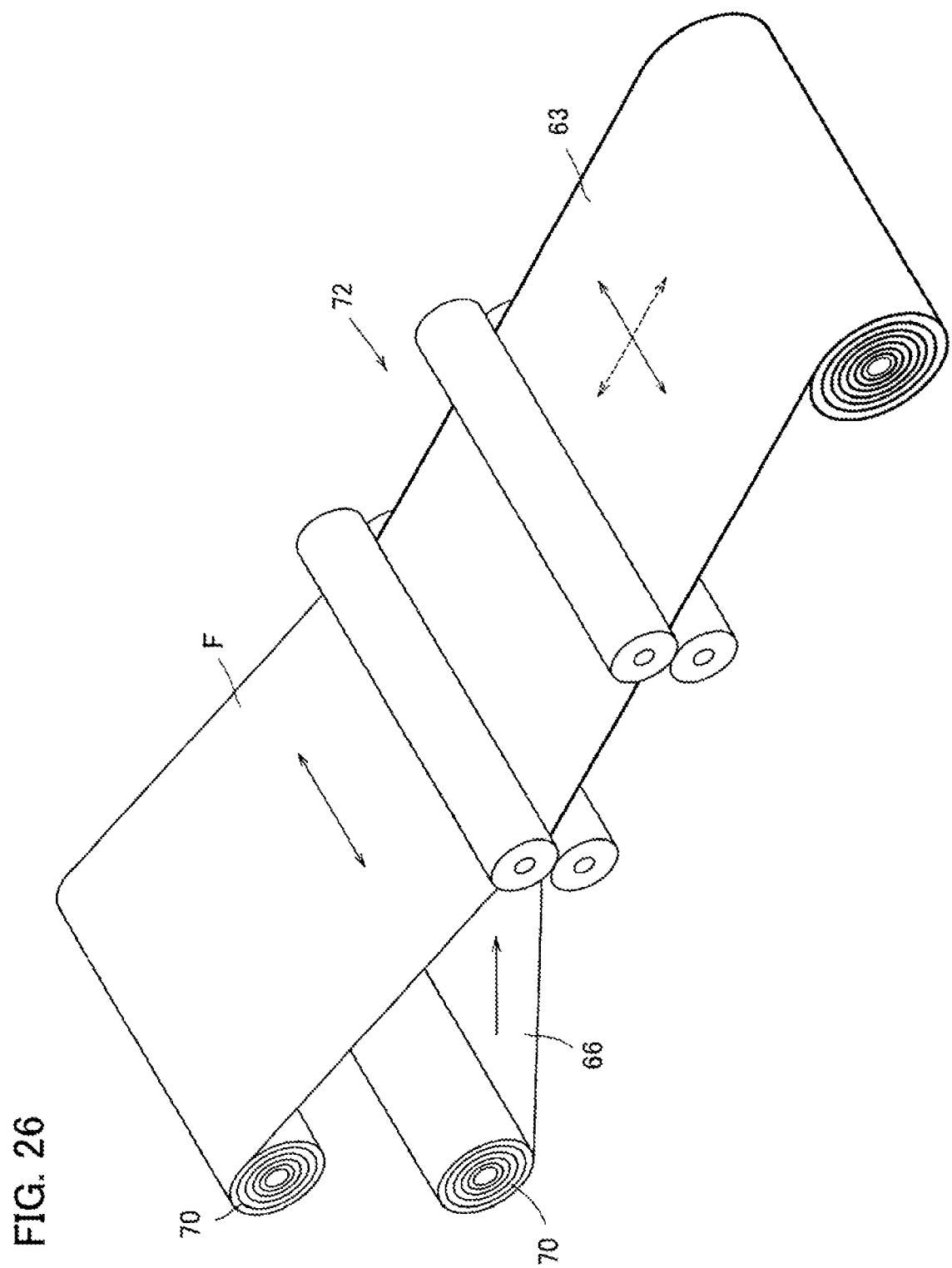

METHOD FOR PRODUCING STRETCHED FILM, METHOD FOR PRODUCING FILM, AND FILM

TECHNICAL FIELD

The present invention relates to a method for continuously producing a film uniaxially stretched only in a direction transverse to the conveying direction. The present invention relates particularly to a production method by which a retardation film excellent in uniformity of optical properties is produced well.

BACKGROUND ART

For example, as described in Patent Document 1, there is known a film stretching machine which stretches a film in a width direction by conveying the film while gripping both side edges of the film with clips, and simultaneously increasing the distance between the clips.

In the film stretching machine disclosed in Patent Document 1, conventional clips to grip a film each have a flapper which swings so that its tip can come into contact with a placing face on which a film is to be placed and the contact angle of the flapper with respect to the placing face is determined so that the tension of the film may act in a direction in which the tension presses the flapper against its placing face. Generally, a gripping part of a flapper is formed with a plane so that it can grip a film in a planar form.

Patent Document 1: JP 2005-104081 A
Patent Document 2: JP 4-230704 A
Patent Document 3: JP 5-11111 A
Patent Document 4: JP 5-11114 A
Patent Document 5: JP 5-288931 A
Patent Document 6: JP 5-288932 A

DISCLOSURE OF INVENTION

Technical Problem

Incidentally, in association with the recent increase in display size of liquid crystal display devices, required qualities of retardation compensation films to be used for improvement in view angle or improvement in contrast of liquid crystal display devices have been becoming higher rapidly. In particular, it has been required that the accuracy of optical axis angle and the variance of retardation are good throughout a large area of a film.

In order for liquid crystal display devices to spread widely in the world, revolutionary cost reduction of components to be used for liquid crystal display devices, that is, revolution of the structure, the material, the way of preparation, the supply, and the like of such components, and increase in productivity by standardization are needed.

In order for a retardation compensation film to appropriately improve the view angle or the contrast of a liquid crystal display device, it is required to have a highly controlled birefringence in the film plane and in the film thickness direction. As a method for highly controlling and imparting the birefringence of a film, a longitudinal stretching method, a transverse stretching method, a successive biaxial stretching method composed of successive longitudinal and transverse stretching, and the like are generally adopted.

In the longitudinal stretching method in which a film is stretched in the conveying direction, it is easy to obtain a film which has been stretched uniaxially only in the longitudinal direction because the film can shrink in the transverse direction freely.

However, in designing a liquid crystal panel, it is also necessary to produce a film which has been stretched uniaxially in the transverse direction because combining retardation films differing in stretching direction is needed.

In stretching a film in a direction transverse to the conveying direction, there has been known a film stretching machine which conveys a film while holding both side edges of the film with clips and simultaneously stretches the film in the transverse direction by increasing the distance between the clips as disclosed in Patent Document 1. In some cases, fixation is performed by using tenter pins instead of the clips.

A conventional clip for gripping a film has a flapper which swings so that the tip thereof can come into contact with a face on which the film is to be placed, and the contact angle of the gripping part of the flapper is determined so that tension of the film may act in a direction in which the tension presses the flapper against the gripping part. Generally, a gripping part of a flapper is formed with a plane so that it can grip a film in a planar form.

Since a film is imparted with polarization properties and so on as a result of change in molecular arrangement caused by the action of stress, to obtain desired optical properties by controlling the molecular arrangement is an object of stretching techniques. However, if a film is simply stretched in a direction transverse to the conveying direction, the film tends to shrink in the conveying direction. Therefore, to a film whose both side edges are fixed with clips or the like acts a tensile stress also in the conveying direction. If such a stress in the conveying direction acts, the film will result in being stretched in the transverse direction and simultaneously being stretched in the longitudinal direction. As a result, it is impossible to realize uniaxial stretching only in the transverse direction and the film is imparted with undesirable properties.

In performing stretching in the transverse direction, a phenomenon so-called bowing occurs, so that decrease in uniformity of the orientation direction of molecules in the transverse direction occurs. Because of these phenomena, it is difficult to obtain a retardation compensation film that can compensate liquid crystal orientation accurately and there has been a problem that when a liquid crystal panel is manufactured by using such a retardation compensation film, the liquid crystal display will exhibit remarkable uneven color development, resulting in deterioration of visibility.

Techniques for solving such problems are disclosed, for example, in Patent Documents 2, 3, 4, and 5. The techniques disclosed in Patent Documents 2, 3, 4, and 5 are methods in which a film stretched also in the longitudinal direction in a transverse stretching step is obtained and then stretching in the longitudinal direction is relaxed by utilizing thermal shrinkage of the film. However, these methods have a problem that two steps, i.e., the transverse stretching step and the relaxation step, are needed and therefore the efficiency is low.

Patent Document 6 discloses a technique of stretching a film in the transverse direction while maintaining a state wherein both side edges of the film have been shaped in a wavy form. This method may make it possible to perform uniaxial stretching only in the transverse direction and it may become possible to relax the bowing phenomenon in the transverse direction. However, Patent Document 6 fails to disclose a method of shaping a film into a wavy form or a stretching method. Particularly, that method is of low practicality because neither means for performing stretching treatment continuously nor means for shaping a film into a wavy form continuously, which are the most important in the production of a film, is disclosed.

The present invention improves a method that includes fixing both side edges of a film fed continuously to a conveying apparatus and stretching the film in a direction transverse to the conveying direction, and it relates to a method for producing a stretched film that has been stretched uniaxially in the transverse direction selectively.

Solution to Problem

In view of the above-described problems, the present inventors studied earnestly and have accomplished an invention having the following features.

A first feature is to make at least one of an upper holding member and a lower holding member of a flapper-type clip have a wavy form in order to stretch a film in a direction transverse to the conveying direction while keeping the film corrugated (i.e., sagged). In the first feature, a film is shaped so that it may corrugate by pinching the film with a wave-formed clip in principle. Regarding the meaning of "to shape" referred to herein, it means not to deform a film plastically but to make a film have a wavy form, not a planar form.

A second feature is to provide means for producing a stretched film uniaxially stretched continuously in the transverse direction selectively by smoothly and certainly performing pinching and conveyance of a film with the above-described wave-formed holding members.

In other words, if the holding members of a flapper-type clip is made to have a wavy form, it is necessary to pull in a film from the upstream side in a process of engaging upper teeth (projections) and lower teeth (projections) of the holding members in contact with a flat film when the film is gripped with a flapper. In this process, there is a problem that it might be impossible to grip the film with clips in a wavy form unless the flapper is rotated by a considerably large force because a large frictional force acts between the film and the upper teeth or the lower teeth of the holding member.

Besides, the frictional force between the holding member and the film would cause formation of wrinkles such that the film is tucked irregularly toward the center or damage of the film according to the relationship between sine and cosine after the tip of the holding member comes into contact with the film placed on a top of the wavy form and before the film is pressed against the bottom of the wavy form and thereby the film is vertically gripped completely.

The flapper disclosed in Patent Document 1 and so on is an item which swings like a pendulum to move close to and away from a face on which a film is to be placed and the swinging direction thereof is perpendicular to the conveying direction of the film. Therefore, the flapper is initially located outside a side edge of the film and swings on an arc-shaped path to move toward the center of the film, and eventually, the tip of the flapper comes into contact with the film. Because the flapper continues to swing on an arc-shaped path after that, the flapper swings toward the center of the film also after it has come into contact with the film, so that it not only pushes a surface of the film but also adds force inward as well.

As described above, the flapper is an item that pushes a film while moving in the width direction of the film. Although the flapper disclosed in Patent Document 1 and so on has a planar form as described above, the frictional force between the flapper and a film would increase if the flapper might be modified to have a wavy form in order to realize the above-described first feature. For this reason, a flapper modified into a wavy form might produce a considerable frictional force with a film and, therefore, a side edge part of the film would move toward the center of the film in association with lateral movement of the flapper, so that the flapper might cause formation of wrinkles in the film or damage of the film.

Generation of frictional force between a film and a clip can be prevented by overfeeding the film so that the film will corrugate in conformity with the gripping form of the clip instead of by pulling in the film from the upstream side by the biting force of the clip.

Hence, a second feature is to provide a film stretching method by which a film can be gripped in a wavy form smoothly by the use of a film-overfeeding apparatus that can overfeed a film while shaping the film into a wavy form.

In the second feature, a film is shaped into a wavy form mainly by the film-overfeeding apparatus. The meaning of "to shape" is as described above, that is, it means not to deform a film plastically but to make a film having a wavy form, not a planar form.

In performing the second feature, although it is preferable to perform the feature together with the first feature, it is also permissible to perform only the second feature. In a case of using a film-overfeeding apparatus that can overfeed a film while shaping it into a wavy form, although it is recommended to stretch a film while holding the film with a clip having an upper holding member and a lower holding member at least one of which is in a wavy form, it is also permissible to stretch a film while holding the film with other conventional clips.

The present invention completed on the basis of the above-described findings relates to a method for producing a stretched film, the method including conveying a film in a conveying direction while pinching both side edges of the film with holding members, and stretching the film in a direction transverse to the conveying direction by increasing the distance between the holding members of both the side edges while conveying the film, wherein each of the holding members is a member that has a pair of holding member pieces and that pinches a side edge of the film between the holding member pieces and at least one of the pair of holding member pieces has at least either a projecting part or a recessed part, and wherein a partial area or the whole area of the film is sagged by the holding members, or a partial area or the whole area of the film is sagged before both the side edges of the film are pinched with the holding members or when both the side edges of the film are pinched with the holding members, and then the film is stretched in the transverse direction while the film is sagged.

The state of "sagging" referred to herein means a state wherein the actual length of a film existing in a specific distance in a conveying condition is longer than the specific distance. It also refers to a state wherein a film has been fed excessively.

In observing the "sagging" state with respect to its form, it may be a corrugated state. Although the "corrugated state" may be a state wherein the form and the pitch of projections and recesses are irregular, it is preferable, for making the quality uniform, that the form and the pitch of the projections and recesses be regular.

States recommended among "sagging" states include a state in which projections and recesses are present regularly like a sine curve and a state in which only projections or only recesses are present like a pulsating state. Besides, a minute vibration form is also permissible.

Although the present invention is to stretch a film in its transverse direction while sagging it to shape into a wavy form, the method for sagging the film (i.e., shaping into a wavy form) is arbitrary. One possible method is to shape a film into a wavy form by holding member pieces. That is, by the use of a pair of holding member pieces each having projections and recesses, a film is sagged by being pinched between the holding member pieces.

In this aspect, both holding member pieces each have both projections and recesses. A form of the projection and/or the recess is not particularly restricted, and a form having a rounded top part or a rounded bottom part and a level form are possible. Although specific examples of the projections and recesses include forms in which a "hill" and a "valley" appear alternately like a sine curve, forms which have only "hills" or only "valleys" to look like projections and recesses are also included. Besides, an acicular form is also included in the projecting and recessed form.

A form of projections and recesses which is recommended most is a wavy form having hills and valleys like a sine curve.

Although it is recommended to make a film corrugated by using a pair of holding member pieces both of which have projections and recesses and pinching the film between the holding member pieces as described above, the present invention is not limited to this configuration. That is, it is also permissible to shape a film into a wavy form by using paired holding member pieces, only one of which has projections and recesses, and pushing the film with the holding member pieces. In this aspect, one holding member piece has a projecting part and a recessed part.

Moreover, it is also possible to shape a film into a wavy form by using a member in which one holding member piece has only a projecting part or a member in which one holding member piece has only a recessed part.

Furthermore, it is also permissible to prepare an apparatus for shaping a film into a wavy form and to shape a film into a wavy form by using this apparatus.

Such a configuration makes it possible to stretch a film in the transverse direction while keeping the film sagged (preferably, shaped in a wavy form). As a result, it becomes possible to shrink the center of a film freely in the conveying direction during stretching, to inhibit stretching of the film in the conveying direction, and to produce a film stretched only in the transverse direction selectively.

Another aspect of the present invention relates to a method for producing a stretched film, the method including conveying a film in a conveying direction while pinching both side edges of the film with holding members, and stretching the film in a direction transverse to the conveying direction by increasing the distance between the holding members of both the side edges while conveying the film, wherein a partial area or the whole area of the film is sagged by pushing at least one face of the film at intervals in the conveying direction before both the side edges of the film are pinched with the holding members or when both the side edges of the film are pinched with the holding members, and then the film is stretched in the transverse direction while the film is sagged.

"To push at least one face of a film at intervals in the conveying direction" as referred to herein means to push a part of the film and push a position which is located away from the part along the conveying direction. For example, it is possible to "push at least one face of a film at intervals in the conveying direction" by pinching the film between members having projections and recesses like a wavy form.

That is, because a member having projections and recesses has projecting parts formed at fixed intervals, a film will be pushed on both sides at intervals in the conveying direction if the film is pinched between members having projections and recesses.

It is also permissible to push a film with a member having only projections.

A representative appearance form of the "sagging" state is a corrugated state as described above.

Such a configuration makes it possible to pinch a continuously fed film in a holding member while keeping the film sagged (preferably, after shaping it into a wavy form), and it becomes possible to stretch the film shaped into a wavy form in the transverse direction continuously and smoothly. By performing such stretching, it is possible to prevent a film from being stretched in the conveying direction simultaneously with being stretched in the transverse direction, thereby producing a film stretched only in the transverse direction selectively.

One example of a member having projections and recesses is a corrugated gripping member having overfeeding projections projecting in a staggered configuration toward a film. As to the corrugated gripping member, it is preferable to adopt one which is to form a clearance that is greater than the thickness of the film when the members are engaged with each other.

This method neither damages a film by adding an excessive pressure to the center portion of the film nor forms wrinkles in a film due to excessive feed.

Still another aspect of the present invention relates to a method for producing a stretched film including conveying a continuously fed film in a conveying direction while holding both side edges of the film, and stretching the film in a direction transverse to the conveying direction while conveying the film, wherein the method includes a step of sagging both side edges of the film with members having projections and recesses, a holding step of holding both the side edges of the sagged film on a conveyor, and a stretching step of stretching the film in the transverse direction by widening the film in the transverse direction while conveying the film by the conveyor.

Such a configuration makes it possible to make a continuously fed film sagging in advance (preferably, shaped in a wavy form in advance) and then grip it to a conveying apparatus while maintaining the sagging state (preferably, in the wavy form), and it becomes possible to stretch the film shaped into a wavy form in the transverse direction continuously and smoothly. By performing such stretching, it is possible to prevent a film from being stretched in the conveying direction simultaneously with being stretched in the transverse direction, thereby producing a film stretched only in the transverse direction selectively.

One preferable aspect of the present invention relates to the aforementioned method for producing a stretched film, wherein the sagging step (preferably a corrugating step; the same shall apply hereinafter) is a step of gradually pressing the members having projections and recesses against the film.

The term "gradually" refers to such a situation that it takes some time from the start to the finish of this action and indicates such a situation that a member having projections and recesses moves at a speed as slow as the movement can be observed visually. It is preferable to take one second or more from the start to the finish of the sagging step (corrugation step).

Another preferable aspect relates to the aforementioned method for producing a stretched film, wherein the sagging step is a step of gradually pinching the film between the members having projections and recesses.

The above-described two aspects make it possible to shape a continuously fed film into a wavy form more smoothly.

A more preferable aspect of the present invention relates to the aforementioned method for producing a stretched film, wherein a form of a wave of the film to be shaped in the sagging step is varied by changing the distance between the members having projections and recesses.

Such an aspect makes it possible to freely control the sagging state of a film, e.g., the shape of the wavy form, and it becomes possible to freely control the effect of inhibiting the stretching of a film in the conveying direction.

A more preferable aspect of the present invention relates to the method for producing a stretched film, wherein the step of holding both side edges of the film shaped, for example, in a wavy form to the conveying apparatus is a step of pinching the film with a holding member having pieces that move close to and away from each other.

A representative example of the "holding member which has members which move close to and away from each other" is a clip. Such an aspect makes it possible to hold a film shaped, for example, in a wavy form to a conveying apparatus while keeping the form of the film.

A more preferable aspect of the present invention relates to the method for producing a stretched film, wherein each of the holding members is a member that has a pair of holding member pieces and that pinches an edge of a film between the holding member pieces and the pair of holding member pieces each have projections and recesses.

Such an aspect makes it possible to hold a film shaped, for example, in a wavy form to a conveying apparatus while keeping the wavy form of the film certainly.

Another preferable aspect of the present invention relates to the method for producing a stretched film, wherein each of the holding members is a member that has a pair of holding member pieces and that pinches an edge of a film between the holding member pieces and one of the pair of holding member pieces has projections and recesses and the other has a planar form.

Such an aspect makes it possible to fix a film shaped, for example, in a wavy form in advance, to a conveying apparatus certainly regardless of the size or the period of the wavy form of the film.

Furthermore, it is recommended to use a film-overfeeding apparatus in the sagging step (corrugating step).

The film-overfeeding apparatus recommended here is:

a film-overfeeding apparatus which is to be combined with a film stretching part to constitute a film stretching machine, wherein the film stretching part has a constitution to pull a film in the width direction while holding side edges of the film under conveyance, the film-overfeeding apparatus is disposed at the upstream of the film stretching part or a position equivalent to the film stretching part, and the apparatus has a corrugated gripping member having a front gripping piece and a back gripping piece, wherein the front gripping piece and the back gripping piece each have overfeeding projections, the overfeeding projections of the front and back gripping pieces are located at staggered positions in the conveying direction of a film, the overfeeding projections are in an engaged state when the front gripping piece and the is back gripping piece are close to each other, the front gripping piece and the back gripping piece are disposed oppositely on the front side and the back side of a film, respectively, and the corrugated gripping member pinches a film between the front and back gripping pieces to sag the film while moving in the conveying direction of the film.

The engaging posture referred to herein indicates a state of mating like gears, and a state wherein projecting and recessed forms face each other and a projection of one form has been inserted in a recess of the other form.

The film-overfeeding apparatus to be adopted in the present invention can temporarily corrugate a film sent in a planar form and feed the film to a film stretching part while keeping the film in the corrugated state.

That is, the film-overfeeding apparatus of the present invention is an apparatus which is to be disposed at the upstream of the film stretching part or at a position equivalent to the film stretching part and which works before the film stretching part holds the film or at the same time when the film stretching part holds the film.

In the following, in order to simplify description, the description is made on the assumption that the film-overfeeding apparatus works before the film stretching part holds the film.

The film-overfeeding apparatus of the present invention has the corrugated gripping member having the front gripping piece and the back gripping piece and the apparatus pinches a film before the film stretching part holds the film.

In the film-overfeeding apparatus of the present invention, the front gripping piece and the back gripping piece each have an overfeeding projection, the overfeeding projections of the front and back gripping pieces are located at staggered positions in the conveying direction of a film, and the overfeeding projections come into an engaging posture when the front gripping piece and the back gripping piece are close to each other.

Therefore, if a film is pinched by the corrugated gripping member having the front gripping piece and the back gripping piece, the film corrugates.

Hence, by the use of the film-overfeeding apparatus of the present invention, it is possible to feed a film to the film stretching part with corrugating the film in advance.

A film-overfeeding apparatus of another aspect is provided with corrugated gripping members that are disposed oppositely on the front and back sides of a film and that pinch the film while moving in the conveying direction of the film, and the corrugated gripping members are arranged along the conveying direction of the film and each have overfeeding projections projecting in a staggered configuration toward the film so as to stretch the film in the width direction.

According to this configuration, the corrugated gripping members pinch a film, so that the overfeeding projections pull in the film from the upstream side to sag the film. This makes it possible to feed the film while making the film have a form in which the film stretching machine will grip the film and, therefore, the film stretching machine can grip the film in a wavy form smoothly.

Besides, a plurality of the corrugated gripping members may be provided at equal intervals to an annular endless member which rotates in a plane perpendicular to the conveyance plane of the film.

This configuration allows a plurality of corrugated gripping members to rotate regularly so that the members can pinch the film from the front side and the back side at a fixed interval.

Besides, in the film-overfeeding apparatus of the present invention, the corrugated gripping members may gradually pinch the film and then release the pinched film after gripping and conveying it for a certain time.

According to this configuration, the corrugated gripping members can pinch a film slowly, so that the members can smoothly pull in and corrugate the film from the upstream side. Besides, it is possible to make the film stretching machine grip both side edges of the film smoothly while the members are gripping the film.

Besides, in the film-overfeeding apparatus of the present invention, the corrugated gripping members may form a clearance which is greater than the thickness of the film at the time of engaging.

This configuration neither damages a film by adding an excessive pressure to the center portion of the film nor forms wrinkles in a film due to excessive feed.

Besides, the film stretching machine has a plurality of clips which rotate on both sides of the film at a speed equal to that of the corrugated gripping members of the film-overfeeding apparatus and which grip side edges of the film, wherein the clips are designed to have a tooth part which grips the film by engaging in a wavy form corresponding to the overfeeding projections of the corrugated gripping members and to grip the side edges of the film when the film is pinched by the corrugated gripping members.

According to this configuration, since a film having been corrugated by corrugated gripping members is gripped by clips having a wavy gripping form, the clips can grip the film smoothly and the film is prevented from getting wrinkles or scars.

Another configuration of the present invention is characterized in that the film is made of a thermoplastic resin.

According to this configuration, it becomes possible to produce a film which has been stretched only in the transverse direction and has a desired stretching ratio.

The most essential part of the present invention is a method for producing a stretched film including conveying a long film in a conveying direction along a longitudinal direction of the film and stretching the film in a direction transverse to the conveying direction while conveying the film, wherein the stretching in the transverse direction is started with a partial area or the whole area of the film sagged beforehand in the longitudinal direction.

The partial area or the whole area of the film can be sagged beforehand in the longitudinal direction by pushing at least one face of the film at intervals in the conveying direction.

It is preferred that the partial area or the whole area of the film is sagged beforehand in the longitudinal direction by pushing one face and the other face of the film in an alternate arrangement.

The partial area or the whole area of the film can be sagged beforehand by pushing the film by pinching the film between members each having projections and recesses.

It is preferred that the partial area or the whole area of the film is sagged beforehand in the longitudinal direction by pushing a central portion in the width direction of the film.

That is, although it is permissible to sag a film by pinching both the side edge parts in the width direction of the film with instruments, it is easier to sag the film by pinching its part other than its edges (i.e., central portion) with instrument so as to sag the whole portion of the film uniformly.

It is preferred that the long film is conveyed by a conveyor and the partial area or the whole area of the long film is sagged so as to be corrugated while the film is kept to have a degree of freedom in the conveying direction with respect to the conveyor.

In the present invention, since a film has a degree of freedom in the conveying direction with respect to conveying means, a film located on the upstream side or the downstream side of the conveying direction is easily pulled in when the film is pinched with an instrument. For example, it is preferable to use the present invention in combination when adopting a configuration wherein projections and recesses is provided to holding members which are to pinch both side edges of a film and the film is sagged by pinching both side edges of the film with the holding members.

It is preferred that both side edges of the film are held with the partial area or the whole area of the film having been sagged beforehand and the film is stretched in a direction transverse to the conveying direction while the film is conveyed in the longitudinal direction.

Besides, the invention relating to a method for producing a retardation compensation film is a method for producing a film, wherein the method includes laminating a long stretched film that has been stretched in the transverse direction and that has been produced by the above-described method for producing a stretched film and a long longitudinally stretched film that has been stretched in the longitudinal direction, while conveying the films in the same direction.

By the method for producing a film of the present invention, it is possible to produce a retardation compensation film or the like continuously.

Another method according to the present invention is a method for producing a film, wherein the method includes laminating a long stretched film that has been stretched in the transverse direction and that has been produced by the above-described method for producing a stretched film and a polarizing plate.

Still another method according to present invention is a method for producing a film, wherein the method includes laminating a long stretched film that has been stretched in the transverse direction and that has been produced by the above-described method for producing a stretched film and a long polarizing plate, while conveying the films in the same direction.

The long polarizing plate is, for example, a film produced by laminating a PVA (polyvinyl alcohol) film stretched in its longitudinal direction and a TAC (triacetylcellulose) film.

The invention relating to a film is a long stretched film of 600 mm or more in width produced by stretching a long film in its transverse direction while conveying it in its longitudinal direction with a partial area or the whole area of the film sagged beforehand in the longitudinal direction, wherein three sampled pieces, one having been taken at a position located on a center line of the film, another having been taken at a position 100 mm away from one side edge, and the other having been taken at a position 100 mm away from the other side edge, each have an Nz coefficient of 1.4 or less.

Another film according to the present invention is a long stretched film of 600 mm or more in width, wherein three sampled pieces, one having been taken at a position located on a center line of the film, another having been taken at a position 100 mm away from one side edge, and the other having been taken at a position 100 mm away from the other side edge, each have an Nz coefficient of 1.4 or less.

A "long film" refers to a film whose length is remarkably greater than its width. There is no clear standard with respect to how many times the length must be greater than the width for being a long film. However, if the length is greater than at least ten times the width, it can be said to be long.

A film is usually shipped after being stretched in the transverse direction and with both sides of the width direction being cut off. Besides, the film is split in the width direction, if necessary.

The width of the film before the splitting may vary, for example, from about 1330 mm to about 1450 mm. As to a wide film as wide as 1330 mm to 1450 mm, the position at which an Nz coefficient is measured should be changed according to the width of the film. For example, an Nz coefficient of a sample piece taken at a position 100 mm away from an edge toward the center is measured on the basis of a state in which both sides in the width direction have been cut off. Specifically, it is a film characterized in that the Nz coefficients of a sample piece taken at the center part, a sample piece taken at a position 100 mm away from the right edge, and a sample piece taken at a position 100 mm away from the left edge are measured and all the measurements are 1.4 or less.

Still another film according to the present invention is a long seamless film of 600 mm or more in width produced by laminating at least two stretched films, wherein the stretching directions of the two stretched films intersect and the two stretched films have an Nz coefficient of 1.4 or less at any position.

Advantageous Effect of the Invention

According to the present invention, it becomes possible to shape a continuously fed film into a wavy form smoothly and to fix it to a conveying apparatus while maintaining its wavy form and, consequently, it is possible to continuously produce a film which has been stretched only in the transverse direction selectively and has been stretched uniformly at every position in the transverse direction.

BRIEF DESCRIPTION OF DRAWINGS

FIG. 1A is a side view of a clip in a first embodiment (the broken line indicates corrugated gripping members), and FIG. 1B is an explanatory diagram showing the relationship between a clip and a film.

FIG. 2A is a side view of a clip in a second embodiment (the broken line indicates corrugated gripping members), and FIG. 2B is an explanatory diagram showing the relationship between a clip and a film.

FIG. 16A is a front view of a clip in a state where the film F in the second embodiment is held, and FIG. 16B is a side view of a clip in a state where the film F in the second embodiment is held.

FIGS. 18A and 18B are each a sectional view illustrating the action of a film in holding the film with the clip in the first embodiment.

FIGS. 19A and 19B are each a sectional view illustrating the action of a film in holding the film with the clip in the second embodiment.

FIG. 25 is a conceptual illustration showing still another modification example of a method of corrugating a film F.

FIG. 26 is a conceptual illustration showing a method of producing a retardation compensation film 63.

BEST MODE FOR CARRYING OUT THE INVENTION

Figure 3:
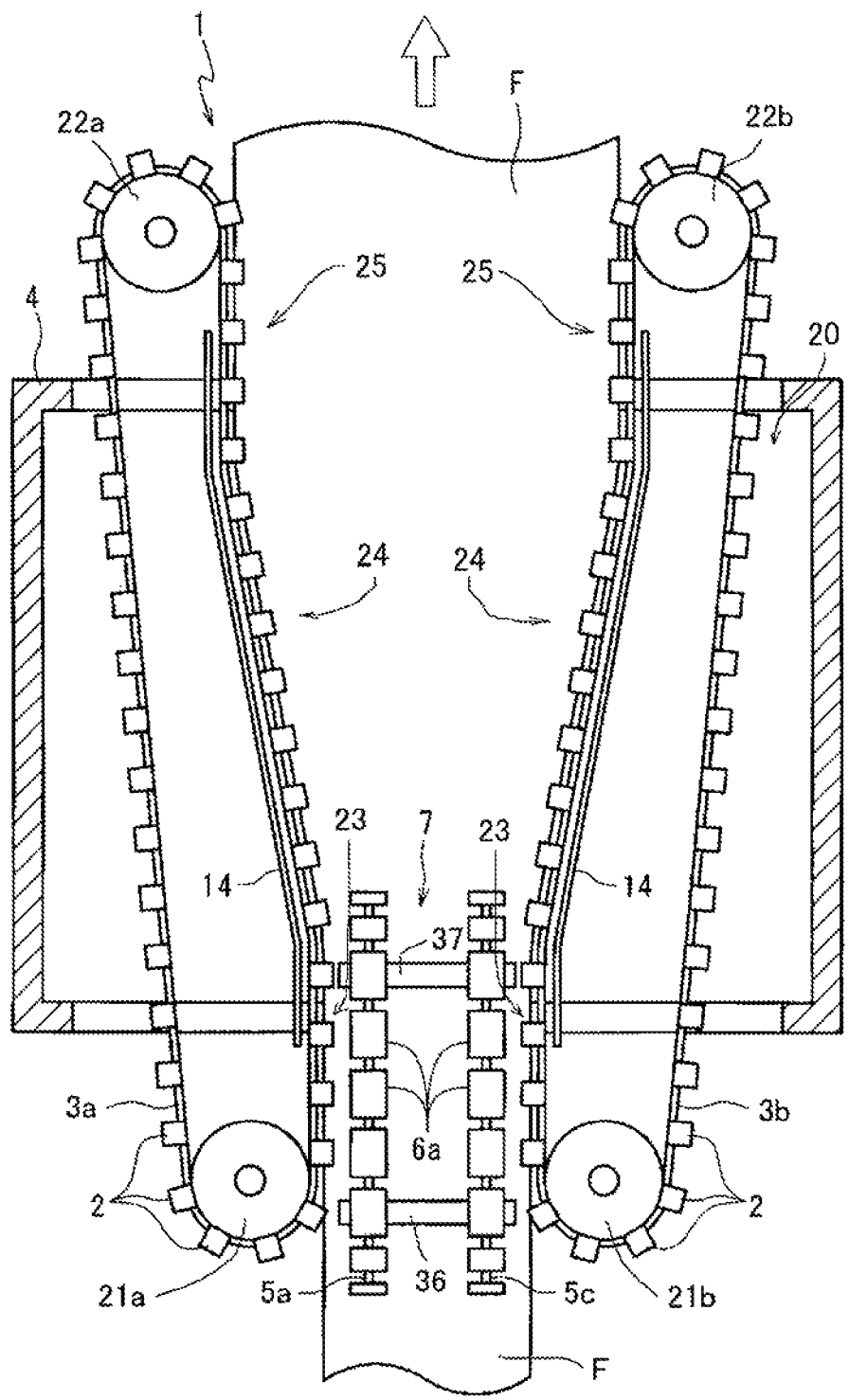
FIG. 3 is a schematic plan view of a film stretching machine of an embodiment of the present invention.

In a basic concept, the present invention is to stretch a film F in a direction transverse to the conveying direction while keeping it shaped in a wavy form by holding the film F with specifically shaped holding members 2, 55, and the film F can be prevented from being stretched in the conveying direction while being stretched in the transverse direction, and it is possible to produce a film F having been stretched only in the transverse direction selectively.

Besides, another gist of the present invention is to continuously carry out, in order to realize the above-described stretching operation continuously and smoothly, a step of feeding the film F, a step of continuously shaping the film F into a wavy form along the conveying direction, a step of gripping both side edges of the film F shaped in a wavy form to a conveying apparatus, and a step of stretching the film F in the transverse direction while conveying it.

Specific methods of the present invention and apparatuses to be used will be described below, but the present invention is not limited thereto.

In the present invention, one preferable mode of a holding member 2 for stretching a film F in a direction transverse to the conveying direction while keeping the film F shaped in a wavy form is a clip in which upper teeth and lower teeth of the holding member 2 both have projecting and recessed forms which can engage. If a clip with this structure is used, it is possible to shape the film F into a wavy form and it will become possible to stretch the film F in a direction transverse to the conveying direction while maintaining that state. The pitch and the size of the projecting and recessed shapes which will bite the film F are selected optionally depending upon the physical properties and the stretching ratio of the film F.

One example of the clip type holding member 2 is illustrated in FIG. 1. The faces of the holding member 2 which will pinch the film F are composed of a corrugated upper teeth part (holding member piece) 12 and a corrugated lower teeth part (holding member piece) 11 which will mate with each other.

Since the film F gripped with such a clip will form a wavy form, it becomes possible to attain the object of the present invention.

Another preferable mode of the holding member for stretching the film F in a direction transverse to the conveying direction while keeping the film F shaped in a wavy form is a clip having such a structure that a holding member 55 like that depicted in FIG. 2 has holding member pieces 56, 57, one of which has projections and recesses and the other is planar. A clip with this structure is preferable because it makes it possible to stretch the film F while shaping it into a wavy form with an arbitrary height or period. Besides, the use of an apparatus which shapes the film F into a wavy form continuously, such as the film overfeeding apparatus, becomes the most preferable embodiment because it is possible to certainly pinch an edge of the film F even if the period or height of the wavy form of the film F shaped is not constant.

The top face of the faces of the holding member 55 which pinches the film F is an upper teeth part (holding member piece) 56 having a wave-shaped projecting and recessed form. On the other hand, the bottom face is a flat plane 57. If a film F in a wavy form shaped by a film-overfeeding apparatus, described later, or the like by using such a clip, it becomes possible to stretch the film F in the transverse direction while maintaining the wavy form.

Next, the outline of a film stretching machine 1 to be used for carrying out the present invention will be described.

A film stretching machine 1 of one embodiment of the present invention is depicted in FIG. 3. The film stretching machine 1 is a machine which has paired tenter chains 3 provided with evenly spaced clips 2 to grip both side edges of a film F, and a heating furnace 4 which heats the film F gripped to the tenter chains 3 by hot blast, and which stretches the film F in the transverse direction by increasing the distance between the tenter chains 3 which are holding the film F. The film stretching machine 1 has a film-overfeeding apparatus 7 that is equipped with two pairs of feeder chains (endless members) 5 each of which is parallel to the conveying direction of the film F and rotates on a plane perpendicular to the conveyance plane (horizontal plane) of the film F on each of the front side and the back side of the film F, and corrugated gripping members 6a and 6b which are held to the feeder chains 5 at the same intervals as those of clips 2 and pinch the film F from the front side and the back side.

The apparatus for shaping a film F to be used for the present invention into a wavy form continuously along the conveying direction is not particularly restricted with respect to its structure as long as it is an apparatus which can shape the film F into a wavy form continuously. For example, the film-overfeeding apparatus 7 depicted in FIG. 3 is preferable because it does not apply unreasonable friction or tension to the film F and can shape a wavy form smoothly.

Figure 5:
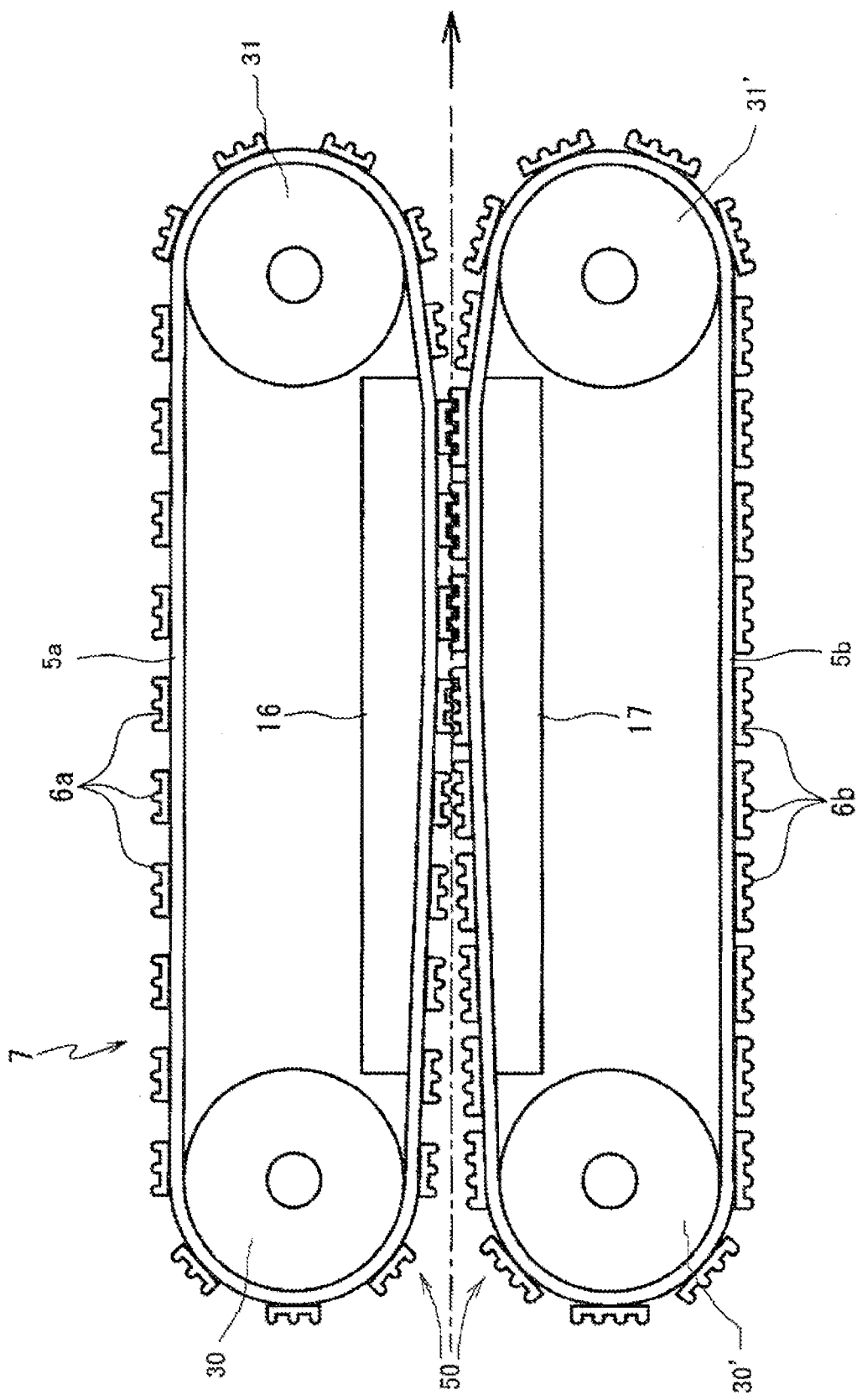
FIG. 5 is a side view of a feeder chain and corrugated gripping members of FIG. 3.

A side view of this film-overfeeding apparatus 7 is shown in FIG. 5. This film-overfeeding apparatus 7 has corrugated gripping members (a front gripping piece and a back gripping piece) 6a, 6b which are disposed oppositely on the front side and the back side of a film F and which pinch the film F while moving in the conveying direction of the film F, wherein the corrugated gripping members 6 are arranged in the conveying direction of the film F and have overfeeding projections 15 which project alternately.

Figure 10A:
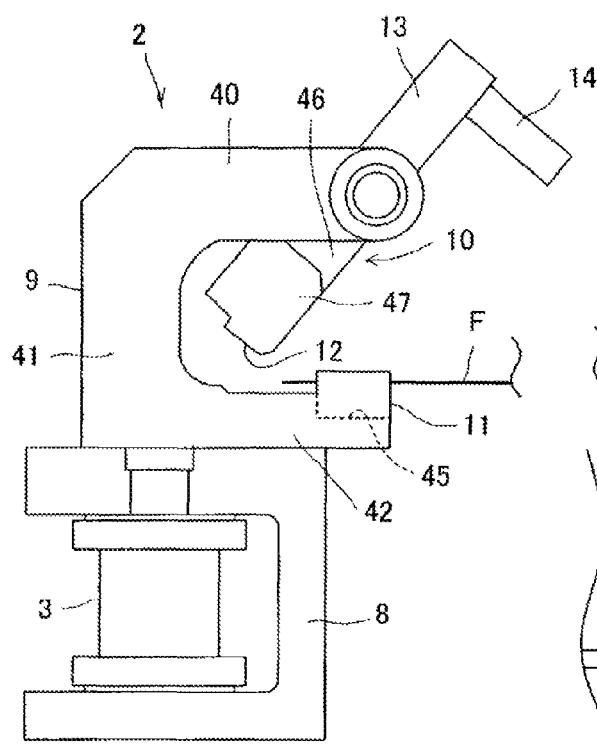
FIG. 10A is a front view of a clip just before holding the film F in the first embodiment.
Figure 10B:
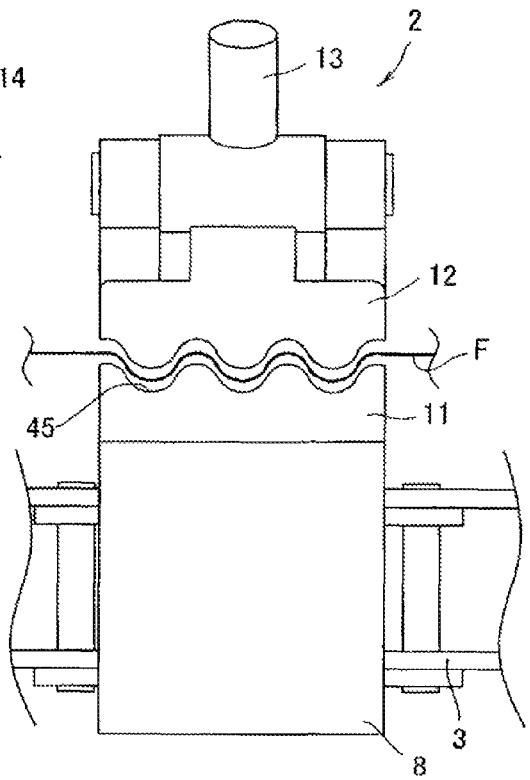
FIG. 10B is a side view of a clip just before holding the film F in the first embodiment.
Figure 11A:
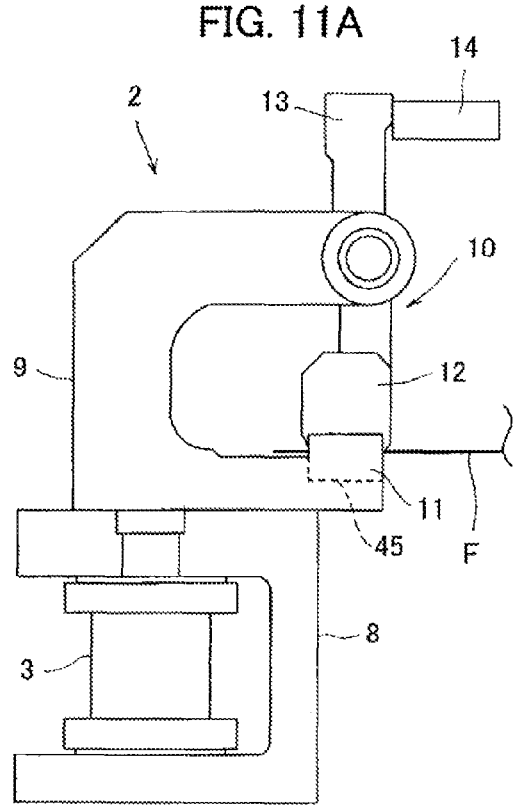
FIG. 11A is a front view of a clip in a state where the film F in the first embodiment is held.
Figure 11B:
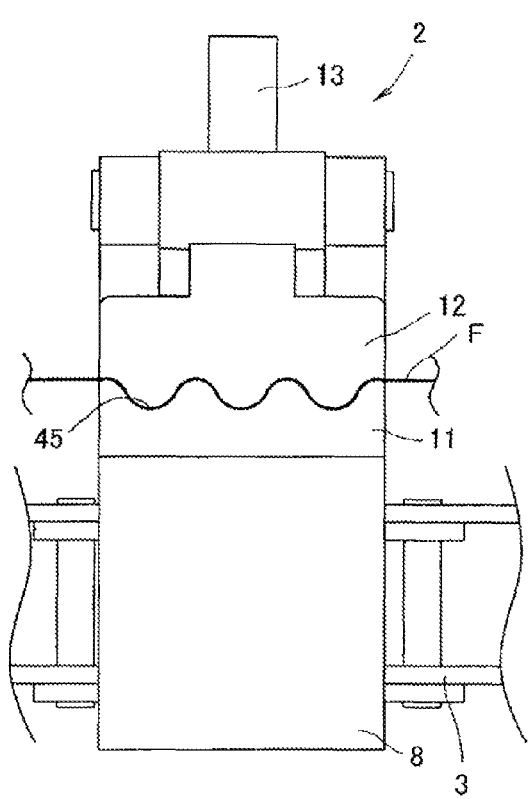
FIG. 11B is a side view of a clip in a state where the film F in the first embodiment is held.

The corrugated gripping members (the front gripping piece and the back gripping piece) 6a, 6b of the film-overfeeding apparatus 7 are fixed to links of the upper and lower feeder chains 5, respectively, at an equal interval. As illustrated in FIGS. 10 and 11, the corrugated gripping members (the front gripping piece and the back gripping piece) 6a, 6b are provided with overfeeding projections 15 which project toward the film F in a staggered configuration at a pitch equal to the pitch of the wave of the lower teeth part 11 and the upper teeth part 12 of the clip 2 in the conveying direction of the film F so that they may extend in the width direction of the film F (i.e., perpendicular to the conveying direction). The corrugated gripping members (the front and back gripping pieces) 6a, 6b are configured to engage when the upper and lower feeder chains 5 are made approach each other by the feeder guides 16 and 17.

The corrugated gripping members (the front and back gripping pieces) 6a, 6b do not come into contact with each other and engage so as to keep a clearance sufficiently larger than the thickness of the film F even if they have approached the closest so as to mutually receive their overfeeding projections. This configuration prevents an excessive compression stress from acting to the center portion of the film F and thereby damaging it.

The overfeeding projections 15 are items for sagging the whole area of the film F along the longitudinal direction in advance by pushing a face of the film F at intervals in the conveying direction.

In the film-overfeeding apparatus 7 to be used for the present invention, a plurality of corrugated gripping members (front and back gripping pieces) 6a, 6b may be provided at equal intervals to annular endless members which rotate in a plane perpendicular to the conveyance plane of the film F.

The height, the width, the shape, and the pitch of the alternately projecting overfeeding projections 15 of the corrugated gripping members 6, the speed at which the upper and lower overfeeding projections 15 approach, and so on may be chosen freely depending upon the length necessary for shrinking the film F, the minimum bending radius for avoiding the damage of the film F, and the like.

In the film stretching machine 1 composed of the above configuration, corrugated gripping members 6a, 6b of the film-overfeeding apparatus 7 pinch the film F gradually from the upper and lower sides first before clips 2 grip the film F. That is, the overfeeding projections 15 push the faces of the film F gradually.

The clips 2 are designed to grip both side edges of the film F with holding members 2 while the film-overfeeding apparatus 7 is pinching the film F by making the corrugated gripping members 6a, 6b approach.

Although the position at which the film F is pinched with the corrugated gripping members 6 from the upper and lower sides is arbitrary, it is necessary to pinch the film F inside from the edges of the film F. This is because it is necessary to make the conveying apparatus hold the edges of the wave-formed film F while maintaining the wavy form of the film F. As to specific positions at which the film F is pinched, it is preferable to pinch positions 5 mm or more inside from both the side edges because interference with holding members (clips) 2 may occur if the positions are too close to the side edges of the film F. From the viewpoint of fixing the film F to the clips 2 certainly, it is more preferable to pinch positions 10 mm or more inside from both side edges. On the other hand, the position where the film F is pinched from the upper and lower sides are preferably positions located within 20 mm from both side edges because if the position are excessively far away from both side edges of the film, the wavy form of the part to be pinched with holding members (clips) 2 will become weaker and waste of the film F will be formed.

As to the apparatus which stretches a film F in the transverse direction while conveying the film, any conventional stretching apparatus can be used without specific limitations. What is common and suitable for the present invention is an apparatus in which two pairs of chains are made to pass through a tenter furnace (heating furnace 4), the aforementioned devices for fixing both side edges of the film F are mounted to the chains, and the distance between the chains is increased as the chains move.

Conditions such as the temperature of the tenter furnace, the stretching ratio of the film F, and the stretching step are arbitrary and the optimal values may be chosen according to the physical properties of the film F.

As to the type of the film F, any type of film may be used. A thermoplastic resin is preferable because it can be easily stretched by heating. Specifically, cellulose resins, vinyl chloride-based resins, polycarbonate-based resins, acrylonitrile-based resin, styrene-based resins, olefin-based resins, polysulfone-based resins, cycloolefin-based resins, norbornene-based resins, and the like are effective as optical retardation films and preferable.

Next, a specific structure of a film stretching machine 1 for carrying out the present invention will be described.

Figure 7:
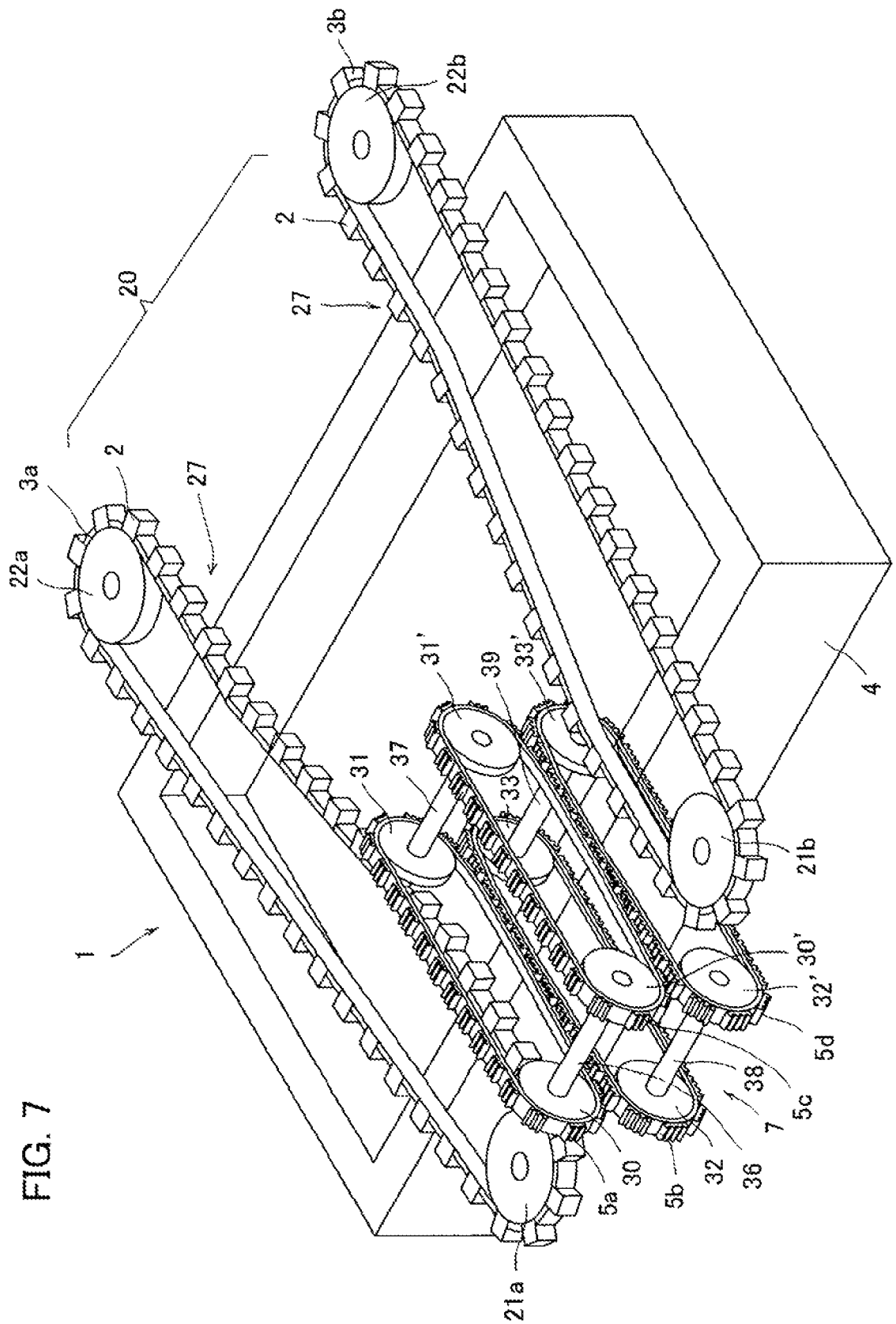
FIG. 7 is a perspective view of a film stretching machine of an embodiment of the present invention.

A film stretching machine 1 of one embodiment of the present invention is depicted in FIGS. 3 and 7.

The film stretching machine 1 of this embodiment is composed of a film stretching part 20, a heating furnace 4, and a film-overfeeding apparatus 7.

The film stretching part 20 has the two series of tenter chains 3a, 3b, and clips 2 which grip both side edges of a film F are mounted to the tenter chains 3a, 3b at equal intervals.

The tenter chains 3a, 3b are respectively suspended on driving sprockets 21a, 21b and driven sprockets 22a, 22b.

The four sprockets 21a, 21b, 22a, and 22b on which the tenter chains 3a, 3b are suspended are all arranged on the same plane as depicted in FIGS. 3 and 7. In an description based on FIGS. 3 and 7, the four sprockets 21a, 21b, 22a, and 22b on which the tenter chains 3a, 3b are suspended each have rotatory shafts in the direction perpendicular to the sheet plane and the four sprockets 21a, 21b, 22a, and 22b are arranged on a plane parallel to the sheet plane.

The two series of tenter chains 3a, 3b are arranged with one traveling surface of one chain opposed to one traveling surface of the other as depicted in FIGS. 3 and 7. The opposite traveling surfaces of the two series of tenter chains 3a, 3b work as stretching action parts 27.

The opposite traveling surfaces (stretching action parts 27) of the two series of tenter chains 3a, 3b are each composed of an introduction-side linear part 23, an inclined part 24, and an end-side linear part 25.

As to the traveling surfaces (stretching action parts 27) of the tenter chains 3a, 3b, the introduction-side linear part 23 and the end-side linear part 25 of one tenter chain 3a, 3b are parallel to the introduction-side linear part 23 and the end-side linear part 25 of the opposite tenter chain 3b, 3a. Moreover, a taper portion is formed of the inclined parts 24 of the opposite tenter chains 3a, 3b.

To the tenter chains 3a, 3b are mounted clips (holding members) 2 at equal intervals, and both side edges of the film F are gripped by the clips 2.

The shape of the clips 2 will be described later.

The heating furnace 4 is one which heats the film F gripped to the tenter chains 3a, 3b by hot blast.

Next, the film-overfeeding apparatus 7 is described.

The film-overfeeding apparatus 7 is composed of two pairs (four series) of feeder chains 5a, 5b, 5c, and 5d.

As to the feeder chains 5a, 5b, 5c, and 5d, the feeder chains 5a and 5b form a pair and the feeder chains 5c and 5d form another pair as shown in FIG. 7.

Four sprockets 30, 31, 32, and 33 on which the pair of feeder chains 5a and 5b is suspended are arranged on the same plane as depicted in FIGS. 3 and 7. The plane constituted by the four sprockets 30, 31, 32, and 33 is a plane that is perpendicular to the plane constituted by the four sprockets 21a, 21b, 22a, and 22b on which the tenter chains 3a and 3b are suspended.

Of the four sprockets 30, 31, 32, and 33, the sprockets 30, 32 are driving sprockets and the sprockets 31, 33 are driven sprockets.

The other pair of feeder chains 5c, 5d is disposed in parallel with the to feeder chains 5a, 5b.

The sprockets 30, 31, 32, and 33 contained in one pair are interconnected with the corresponding sprockets 30', 31', 32', and 33' contained in the other pair by common shafts 36, 37, 38, and 39. Therefore, the sprockets 30, 31, 32, and 33 rotate synchronously and the feeder chains 5c and 5d also run synchronously.

Of the two pairs (four series) of feeder chains 5a, 5b, 5c, and 5d, to the feeder chains 5a and 5c located on the upper side on the basis of FIG. 7 are mounted a plurality of front gripping pieces 6a at equal intervals. On the other hand, to the feeder chains 5b and 5d located on the lower side on the basis of FIG. 7 are mounted a plurality of back gripping pieces 6b at equal intervals.

The front gripping pieces 6a attached to the upper feeder chains 5a and 5c and the back gripping pieces 6b attached to the lower feeder chains 5b and 5d are coupled to constitute corrugated gripping members 6. The shapes of the front gripping pieces 6a and the back gripping pieces 6b will be described later.

The above-described two pairs (four series) of feeder chains 5a, 5b, 5c, and 5d are located in the area which is approximately surrounded by the tenter chains 3a and 3b of the film stretching part 20.

The length of the feeder chains 5a, 5b, 5c, and 5d of the film-overfeeding apparatus 7, which is the distance between the shafts of sprockets, is shorter than that of the tenter chains 3a, b of the film stretching part 20.

Therefore, the beginning portions of the feeder chains 5a, 5b, 5c, and 5d of the film-overfeeding apparatus 7 are located slightly upstream of the beginning portions of the tenter chains 3a, b of the film stretching part 20, and the ending portions of the feeder chains 5a, 5b, 5c, and 5d are located at the ending portion of the introduction-side linear part 23.

The feeder chains 5a, 5b, 5c, and 5d of the film-overfeeding apparatus 7 and the tenter chains 3a and 3b run synchronously.

The heating furnace 4 is disposed at a position of the inclined parts 24 of the tenter chains 3a, b in the film stretching part 20.

Next, the clips (holding member) 2 mounted to the tenter chains 3a, 3b are described.

Figure 4:
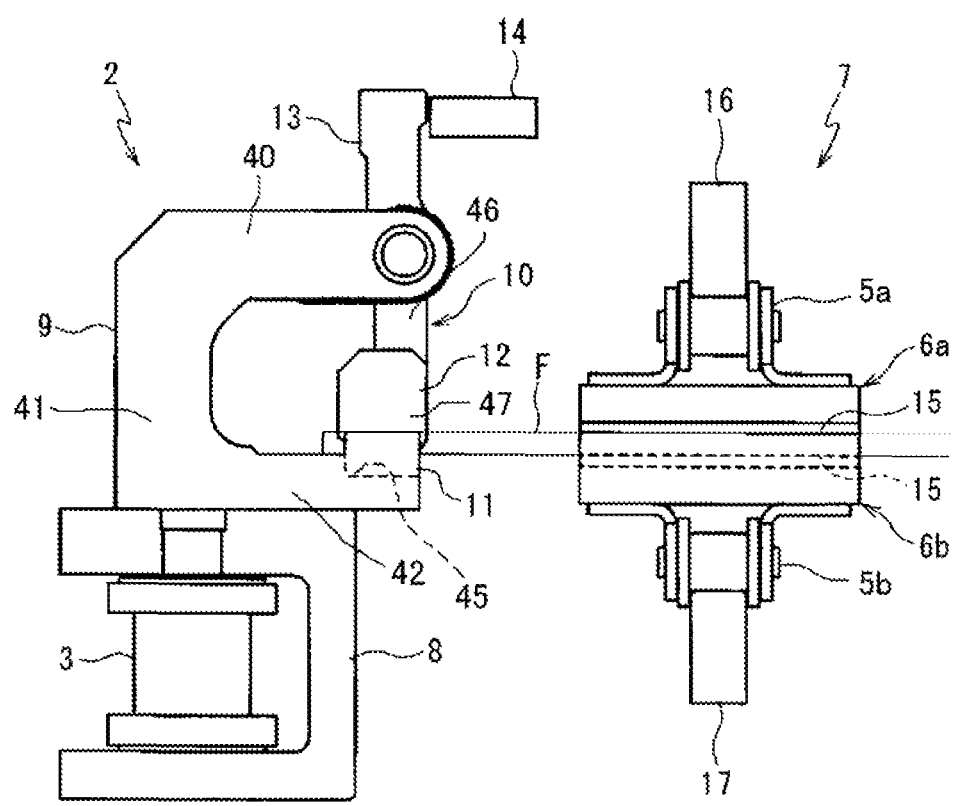
FIG. 4 is a front view of a clip and corrugated gripping members.

FIG. 1 and FIG. 2 are side views of clips. FIG. 4 is a front view of a clip and corrugated gripping members.

Figure 8:
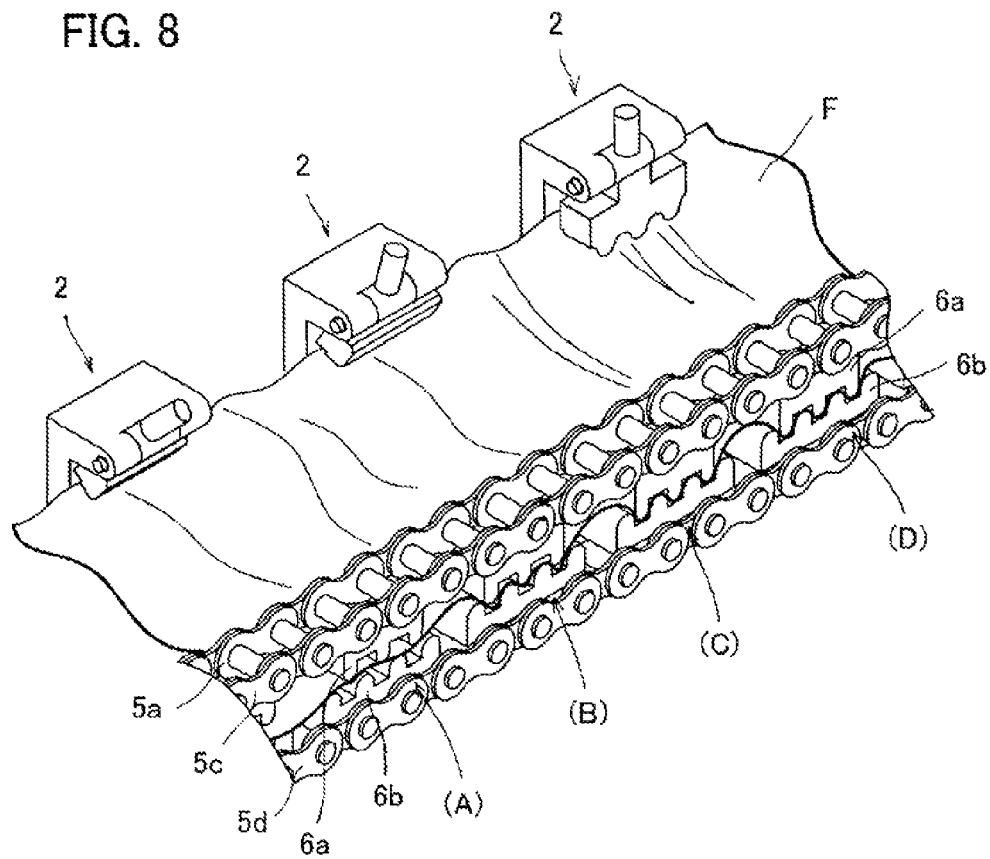
FIG. 8 is a sectional perspective view of a film stretching machine in a state where a film is held.
Figure 9:
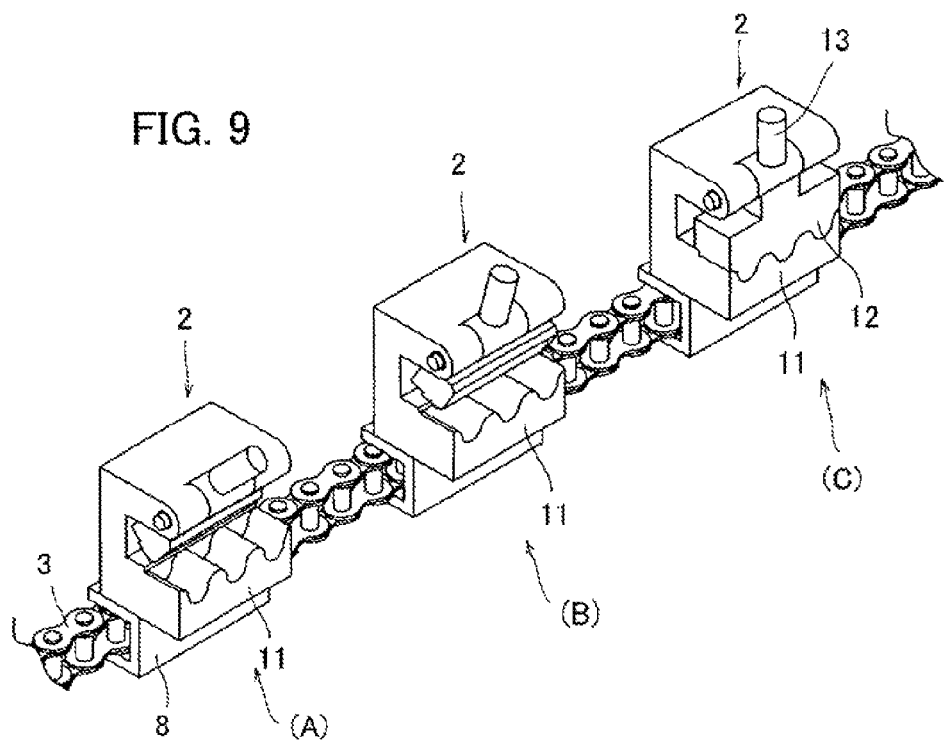
FIG. 9 is a perspective view of a clip in the first embodiment.

FIG. 8 is a cross-sectional perspective view of the film stretching machine 1 in a state where a film F is held. FIG. 9 is a perspective view of clips 2. FIG. 10 shows a side view and a front view of a clip just before holding a film F, and FIG. 11 shows a side view and a front view of a clip in a state where a film F has been held.

A clip 2 is mounted to a tenter chain 3 through a base 8 as illustrated in FIGS. 4, 9, 10, and 11. That is, the base 8 is fixed to a pin of the tenter chain 3 by conventional means and the clip 2 is placed on the base 8.

The clip 2 is an item that has a frame 9 which forms an approximate C-shape which opens toward the film F, wherein a flapper 10 has been mounted to the frame 9 as illustrated in FIGS. 4, 9, 10, and 11.

That is, the flame 9 is in the form of the C-shape which has a top side 40, a vertical side 41, and a lower side 42. The top face (inner surface) of the lower side 42 of the frame 9 functions as a film placing face 45 and has a wavy form (lower teeth part 11) in this embodiment. That is, the film placing face 45, which is a holding member piece, is in a wavy form and has projections and recesses. The film placing face 45 can be said to be provided with the projections at fixed intervals.

The flapper 10 has a rod part 46 and a pushing part 47. The middle part of the rod part 46 is pivotted to the top side 40 of the frame 9, and the flapper 10 swings like a pendulum. The swinging direction of the flapper 10 is the width direction of the film F. That is, the pushing part 47 of the flapper 10 moves while drawing an arc path. For this reason, when it swings as shown in FIG. 10 and the rod part 46 is in an inclined posture, the pushing part 47 separates from the film placing face 45. On the other hand, when the rod part 46 is a droopy posture, the bottom face of the pushing part 47 approaches the film placing face 45 and pushes the film placing face 45.

In the flapper 10 of this embodiment, the bottom face of the pushing part 47 has a wavy form (upper teeth part 12). That is, the pushing part 47, which is a holding member piece, is also in a wavy form and has projections and recesses. The pushing part 47 also can be said to be provided with the projecting parts at fixed intervals.

When the rod part 46 comes in a droopy posture, the wavy form of the bottom face of the pushing part 47 (upper teeth part 12) and the wavy form of the film placing face 45 (lower teeth part 11) coincide.

Since the flapper 10 is so configured that the middle part of the rod part 46 is pivotted to the top side of the frame 9 as described above, the top end of the rod part 46 projects above the top side 40 of the frame 9.

Therefore, pushing of the top end of the rod part 46 in the transverse direction makes it possible to swing the flapper 10 and to make the pushing part 47 of the flapper 10 move close to and away from the film placing face 45 as described above.

In this embodiment, long clip guides 14 are provided near the tenter chains 3a and 3b, and the top ends of the rod parts are kept in contact with the clip guides 14. The alignment of the clip guide 14 and the frame 9 has been designed to vary position by position, and the flapper 10 is swung by pushing the top end of the rod part 46 with the clip guide 14.

In FIG. 4 are illustrated the details of a clip 2 holding a film F and a corrugated gripping member 6. The clip 2 has a frame 9 that is fixed to one of the bases 8 mounted to links of a tenter chain 3 at equal intervals and forms an approximate C-shape which opens toward the film F, and a flapper 10 which is pivotted swingably at the tip of the top side of the frame 9. The flapper 10 has at its tip an upper teeth part 12 which engages with a lower teeth part 11 provided at the tip of the lower side of the frame 9. The flapper 10 is configured so that an arm part 13 extending above the frame may be guided by a clip guide 14 to swing. The clip 2 grips or releases a side edge of the film F with the lower teeth part 11 and the upper teeth part 12 in association with the swing of the flapper 10.

As illustrated in FIG. 5, the lower teeth part 11 and the upper teeth part 12 of the clip 2 are configured to engage in a wavy form which rises and descends periodically at a prescribed pitch in the conveying direction of the film F.

Next, front gripping pieces 6a and back gripping pieces 6b attached to the feeder chains 5a, 5b, 5c, and 5d are described.

Figure 6:
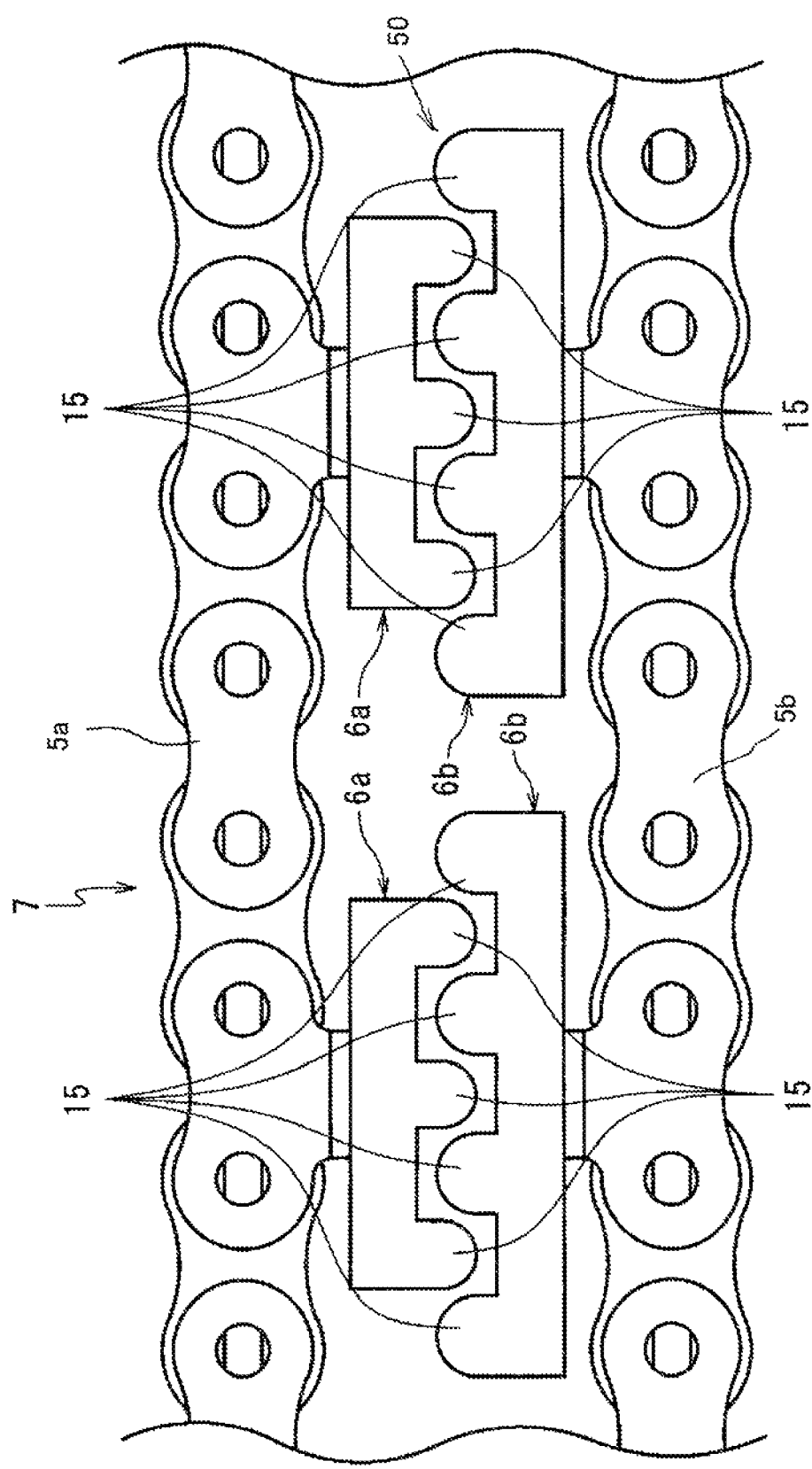
FIG. 6 is a partially enlarged side view of the feeder chain and the corrugated gripping members of FIG. 3.

As described above, the four feeder chains 5a, 5b, 5c, and 5d are arranged with being divided into two pairs, and each pair of feeder chains (5a, 5b) and (5c, 5d) are disposed on the upper side and the lower side. FIG. 5 illustrates a pair of feeder chains 5a and 5b. FIG. 6 enlarges a part of FIG. 5 and illustrates a corrugated gripping member 6 constituted of a front gripping piece 6a and a back gripping piece 6b.

In this embodiment, the opposite traveling surfaces of the feeder chains 5a and 5b (or 5c, 5d) function as feeding action parts 50 as illustrated in FIG. 5.

In this embodiment, a feeder guide 16 is provided in the traveling path on the side of the feeding action part 50 in an area surrounded by the feeder chain 5a located on the upper side. The feeder guide 16 has a length which extends over the approximately whole area of the traveling path on the side of the feeding action part 50. The feeder guide 16 has a form with a middle part of the traveling path projecting outward (to the lower side based on the diagram). More specifically, the feeder guide 16 has a guide face which inclines gently and the vicinity of the end of the traveling path projects outward.

Likewise, the feeder chain 5b located on the lower side is also provided with a feeder guide 17. The feeder guide 17 has a guide face which inclines gently and the vicinity of the end of the traveling path projects outward.

In this embodiment, front gripping pieces 6a are attached to the feeder chain 5a located on the upper side and back gripping pieces 6b are attached to the lower feeder chain 5b.

Figure 12:
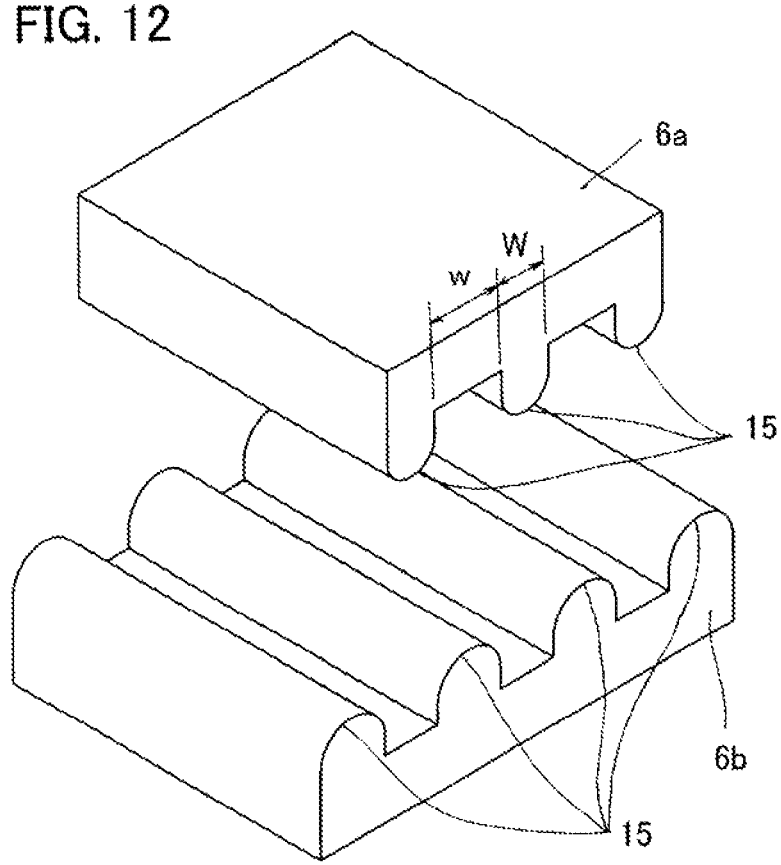
FIG. 12 is a perspective view of corrugated gripping members to be used in this embodiment.

Each of the front gripping pieces 6a attached to the feeder chain 5a is provided with three overfeeding projections 15 on the bottom face as shown in FIG. 12.

The overfeeding projections 15 project toward a film F and they are in a rib-like form and have a length along their crest. That is, each overfeeding projection 15 extends over the overall width of the front gripping piece 6a. The direction of the crest of the overfeeding projection 15 is along the width direction of the film F.

A position where there is no overfeeding projection 15, i.e., a position of a "valley" of the overfeeding projection 15, is flat. The width W of the overfeeding projection 15 is smaller than the interval w between adjoining overfeeding projections 15.

The front gripping piece 6a can be said to be an item in which overfeeding projections 15 have been formed at certain intervals. Although the intervals of the overfeeding projections 15 were made constant as a recommended configuration in this embodiment, the intervals between the overfeeding projections 15 may be uneven. The same can be applied to the back gripping piece 6b which will be described later.

In addition, the bottom face of the front gripping piece 6a may be a corrugated face like a sine curve.

In this embodiment, a plurality of front gripping pieces 6a are provided at equal intervals to the feeder chain 5a located on the upper side. Also from this respect, the front gripping piece 6a can be said to be an item in which overfeeding projections 15 have been formed at certain intervals.

The intervals between the front gripping pieces 6a are equal to the intervals of the clips 2.

The back gripping pieces 6b provided to the feeder chain 5b located on is the lower side are also provided with overfeeding projections 15.

The back gripping piece 6b also can be said to be an item in which overfeeding projections 15 have been formed at certain intervals.

The shape and the intervals of the overfeeding projections 15 provided to the back gripping piece 6b located on the lower side are the same as those of the front gripping piece 6a described previously. However, the front gripping piece 6a had three overfeeding projections 15, whereas the back gripping piece 6b on the lower side has four overfeeding projections 15.

In this embodiment, a plurality of back gripping pieces 6a are provided at equal intervals to the feeder chain 5b located on the lower side.

Also from this respect, the front gripping piece 6a can be said to be an item in which overfeeding projections 15 have been formed at certain intervals.

The intervals between the back gripping pieces 6b are equal to the intervals of the front gripping pieces 6a described above.

The feeder chain 5a located on the upper side and the feeder chain 5b located on the lower side run synchronously, and the axial center of the front gripping piece 6a and that of the back gripping piece 6b always coincide in the traveling surfaces (feeding action parts) 50 in which the chains 5a and 5b oppose each other.

Since the feeder chains 5a and 5b are provided with the feeder guides 16 and 17, respectively, as described previously and the traveling paths of the feeder chains 5a and 5b project outward at their centers, the relative distance between the front gripping piece 6a and the back gripping piece 6b will vary according to the traveling position of the feeder chains 5a and 5b.

Figure 13:
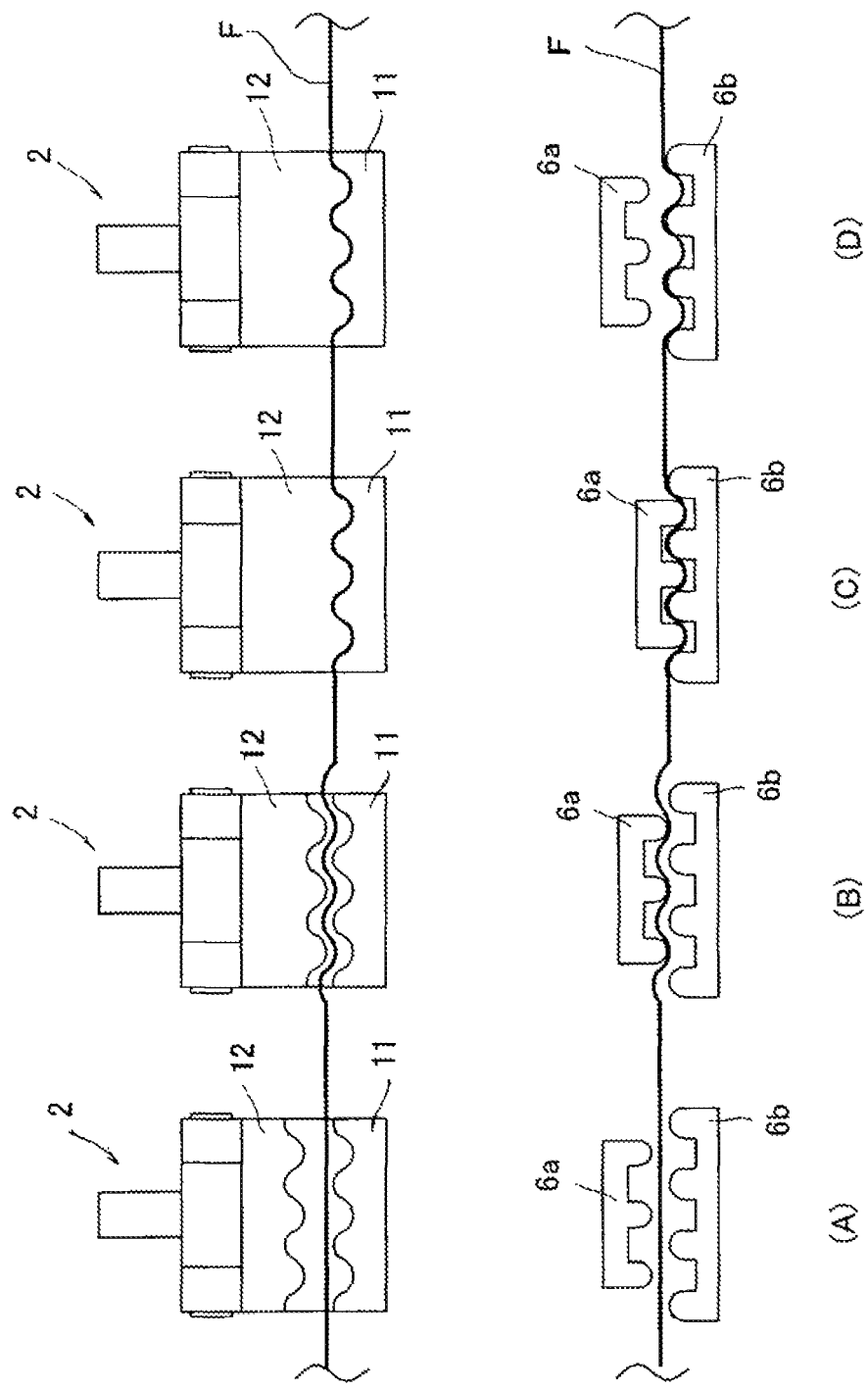
FIG. 13 is an explanatory diagram illustrating the relationship between the position of a film and the posture of a clip and corrugated gripping members in the first embodiment.

Namely, since both the feeder guides 16 and 17 project outwardly the ends of the feeding action parts 50 of the feeder chains 5a and 5b, the feeder guides 16 and 17, and the front gripping piece 6a and the back gripping piece 6b will approach the closest when these have moved to the feeding action parts 50 of the feeder chains 5a and 5b (FIG. 13, line C).

On the other hand, at the beginnings of the feeding action parts 50, the clearance between the front gripping piece 6a and the back gripping piece 6b is open like line A of FIG. 8 and line A of FIG. 13.

Therefore, when the feeder chains 5a and 5b have traveled and the front gripping piece 6a and the back gripping piece 6b have gone around to reach the side of the feeding action parts 50 (the opposing traveling surfaces), the front gripping piece 6a and the back gripping piece 6b face each other and then the front gripping piece 6a and the back gripping piece 6b will travel in the feeding action parts 50 while keeping their opposing posture.

At the beginning of the feeding action parts 50, the clearance between the front gripping piece 6a and the back gripping piece 6b is open widely as illustrated in line A of FIG. 13.

Specifically, the crests of the front gripping piece 6a and the crests of the back gripping piece 6b are separated vertically as illustrated in line A of FIG. 13. As the pieces travel in the feeding action parts 50, the clearance between them decreases as illustrated in line B of FIG. 13, so that the crests of the front gripping piece 6a and the crests of the back gripping piece 6b will engage.

As the pieces travel in the feeding action parts 50, the clearance between them further decreases, so that the front gripping piece 6a and the back gripping piece 6b will push the surfaces of the film F. Since the front gripping piece 6a and the back gripping piece 6b have overfeeding projections 15 at staggered positions, a counterforce generated when the tips of the overfeeding projections 15 on the front gripping piece 6a pushes a surface of the film F toward the lower side of the diagram is held by the overfeeding projections 15 of the back gripping piece 6b located at an opposite position.

For this reason, the film F is shaped into a wavy form only in a position pinched by the corrugated gripping member 6 without moving up or down as a whole.

As described above, since the front gripping piece 6a and the back gripping piece 6b can be said to be items in which overfeeding projections 15 have been formed at certain intervals, it can also be considered that the front and the back surfaces of the film F have been pushed at intervals in the conveying direction and, as a result, only the position which has been pinched by the corrugated gripping member 6 sags and the film is shaped into a wavy form.

Since the front gripping piece 6a and the back gripping piece 6b travel to approach gradually as the feeder chains 5a, 5b run, the film F will resultantly been pinched gradually between the front gripping piece 6a and the back gripping piece 6b.

When the front gripping piece 6a and the back gripping piece 6b have reached near the end of the feeding action parts 50, the front gripping piece 6a and the back gripping piece 6b approach closest.

When the front gripping piece 6a and the back gripping piece 6b have reached near the end of the feeding action parts 50, the front and back gripping pieces 6a and 6b will come into an engaging posture as illustrated in line C of FIG. 8 and line C of FIG. 13, but the front and back gripping pieces 6a and 6b do not come into contact.

To describe more specifically, even if the front and back gripping pieces 6a and 6b approach closest, the crests of the front gripping piece 6a will not come into contact with the valleys of the back gripping piece 6b and the valleys of the front gripping piece 6a will not come into contact with the crests of the back gripping piece 6b.

Besides, since the width W of an overfeeding projection 15 is smaller than the interval w between adjoining overfeeding projections 15, there is no possibility that an overfeeding projection 15 of the front gripping piece 6a and an overfeeding projection 15 of the back gripping piece 6b come into contact with each other although these will form a nest state.

The tenter chains 3 and the feeder chains 5 are designed to rotate at the same circumferential speed, and clips 2 and corrugated gripping members 6a, 6b are provided at equal intervals so that they may come to the same position in the conveying direction of the film F when they grip the film F as illustrated in FIG. 3 and FIG. 8. The overfeeding projections 15 of the corrugated gripping members 6a and 6b are formed so as to correspond in number to the peaks of the wavy forms of the lower teeth part 11 and the upper teeth part 12 of a clip 2, respectively.

Next, the action of the film stretching machine 1 of this embodiment will be described.

First, since a film F is pinched between the corrugated gripping members 6a and 6b of the film-overfeeding apparatus 7 and is pushed by the overfeeding projections 15 in a staggered configuration from both sides, a wavy form with the overfeeding projections 15 as peaks is formed (see line B of FIGS. 8 and 13). That is, the film sags. At this time, since the film F needs to have an excess length for corrugation, the film-overfeeding apparatus 7 will resultantly pull in the film F from the upstream side at a speed (e.g., 1.2 times, i.e. 18 msec) greater than the conveying speed of the feeder chains 5 (e.g., 15 m/sec).

It is preferable that the conveying speed of the film-overfeeding apparatus 7 be higher than the conveying speed of the feeder chains 5 as described above, and an appropriate speed range is 1.05 times to 1.50 times the conveying speed of the feeder chains 5.

When the film-overfeeding apparatus 7 pulls in the film F from the upstream side, the film F will resultantly scrape the overfeeding projection 15. Therefore, it is preferable to form the overfeeding projections 15 of a material such that the friction with the film will be reduced. The overfeeding projections 15 may be substituted with rollers which can rotate independently.

It is ideal that the length of the film F pinched between the corrugated gripping members 6a and 6b agree precisely with the length of the engaged form of the lower teeth part 11 and the upper teeth part 12 of the clip 2. However, if the film F has been fed excessively than the gripping form of the clip 2, the clip 2 may form a wrinkle in the film F. In this embodiment, the length of the film F pinched between the corrugated gripping members 6a and 6b is adjusted so that it may become slightly shorter than the length of the gripping form of the clip 2, and the clip (holding member) 2 will pull in the film F more from the upstream side when gripping the film F. However, since the length of the film F which the clip 2 pulls in is very small, there is no possibility that an excessive force is added to a clip guide 14 or the film F is damaged.

When the clips 2 have reached positions where they hold both side edges of the film F completely, the corrugated gripping members 6a and 6b will separate as depicted in line D of FIG. 13 and the corrugated gripping members 6a and 6b release the film F.

The film stretching machine 1 conveys the film F while corrugating and gripping it with the clips (holding members) 2 also after the corrugated gripping members 6a and 6b of the film-overfeeding apparatus 7 released the film F. That is, the film stretching machine 1 starts stretching in the transverse direction while keeping at least part of the film F sagged in the longitudinal direction in advance.

The film stretching machine 1 stretches the film F in the width direction by extending the distance between the tenter chains 3 in the heating furnace 4.

Since each clip (holding member) 2 holds the film F corrugated, the film stretching machine 1 can make a central effective part of the film F shrink freely in the longitudinal direction (conveying direction) and therefore no tensile stress generates in the longitudinal direction when the machine stretches the film F in the heating furnace 4 in the width direction (e.g., to a stretching ratio of 1.2). This makes it possible to arrange the orientation axis of the film F (the orientation of molecular chains) efficiently in the width direction. In addition, since the vicinities of both side edges of the film F gripped with clips 2 receive a stress in the longitudinal direction, these portions will be cut away in a post process.

The film-overfeeding apparatuses 7 illustrated in FIG. 3 and the following drawings have a clip 2 which holds a side edge of a film F, and in the clip 2 the surfaces of both the pushing part 47 side and the film placing face 45 are in a wavy form. That is, in FIGS. 9, 10, 11, and 13 in the preceding embodiments, a clip (holding member) 2 in which the surfaces of both the pushing part 47 side and the film placing face 45 are in a wavy form is provided as an example.

However, the clip 2 is not restricted to one in which the surfaces of both the pushing part 47 side and the film placing face 45 are in a wavy form, and as illustrated in the foregoing FIG. 2, it is also permissible that only one part is of a wavy form or a teeth form and the other is of a planar form.

Figure 14:
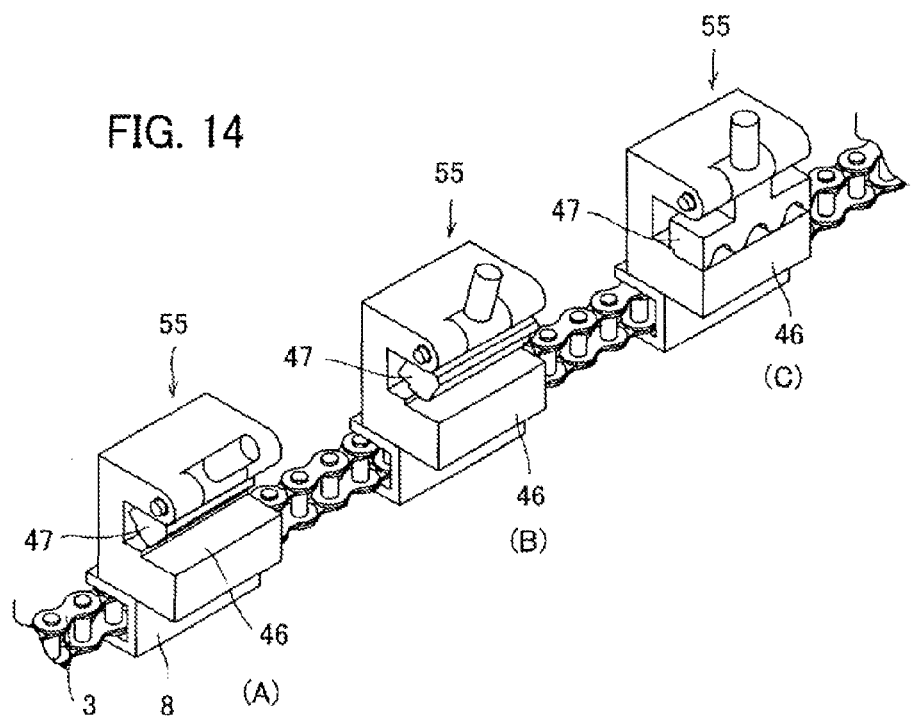
FIG. 14 is a perspective view of a clip in the second embodiment.
Figure 15A:
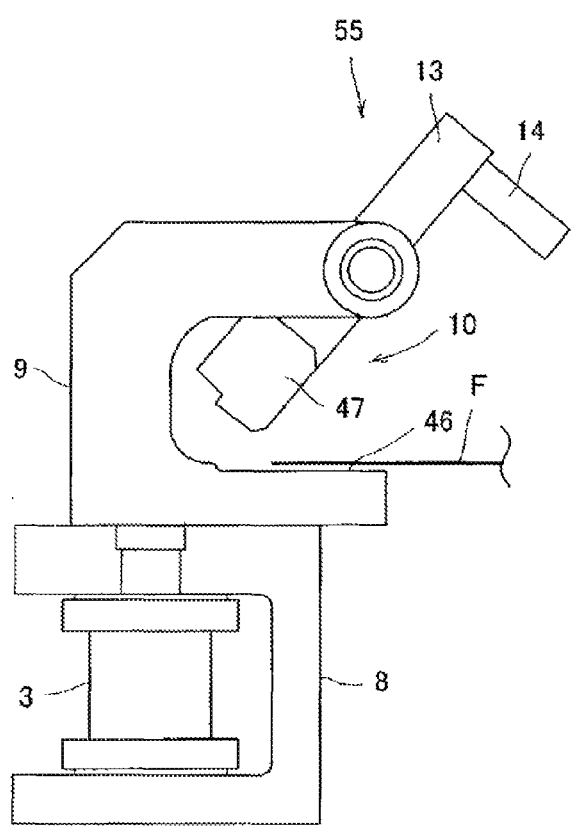
FIG. 15A is a front view of a clip just before holding the film F in the second embodiment.
Figure 15B:
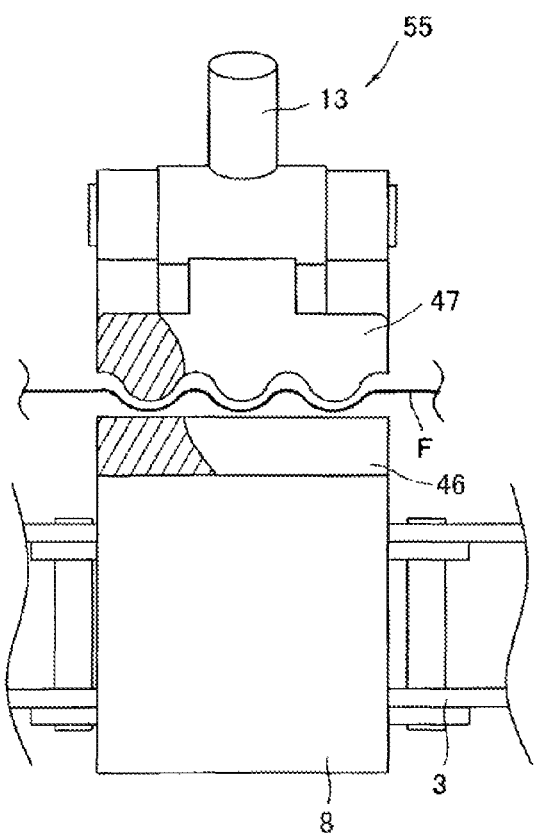
FIG. 15B is a side view of a clip just before holding the film F in the second embodiment.
Figure 17:
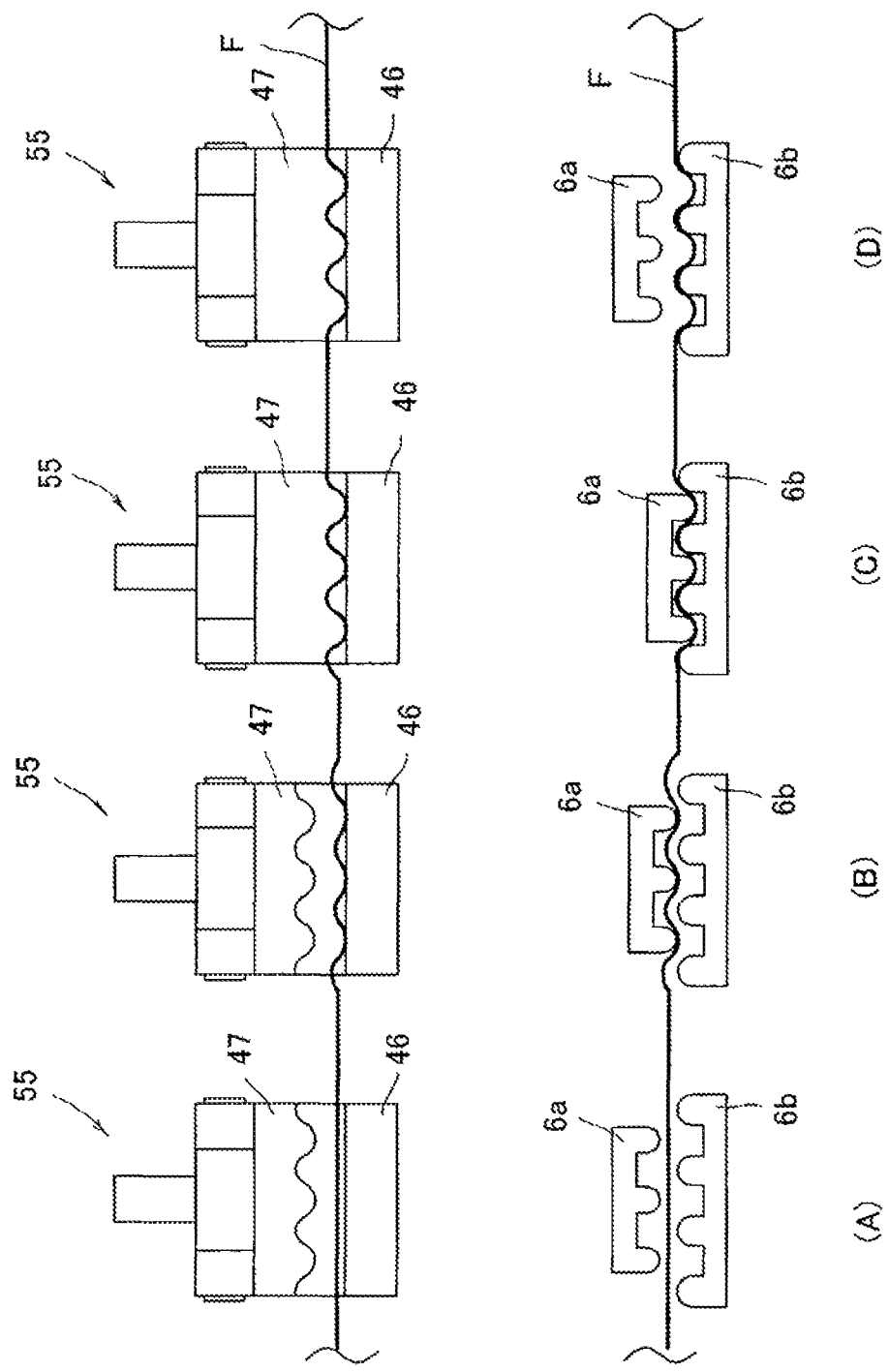
FIG. 17 is an explanatory diagram illustrating the relationship between the position of a film and the posture of a clip and corrugated gripping members in the second embodiment.

FIGS. 14, 15, 16, and 17 illustrate an external form and actions when a clip 55 in which only the pushing part 47 side is in a wavy form and the other (i.e., the film placing face 53) is in a planar form is adopted. FIG. 14 is a perspective view of a clip corresponding to FIG. 9, FIG. 15 includes a side view and a plan view of a clip corresponding to FIG. 10, FIG. 16 includes a side view and a plan view of a clip corresponding to FIG. 11, and FIG. 17 is an explanatory diagram corresponding to FIG. 13.

The clip 55 has both projections and recesses in only one holding member piece. The clip 55 can also be said to be one in which projections are provided at fixed intervals in one holding member piece.

Although in FIG. 13 of a foregoing embodiment, a clip 2 is illustrated to be closed slowly in synchronization with the motion of the corrugated gripping members 6a and 6b, in the embodiment illustrated in FIG. 17, the clip 2 is fully open until the corrugated gripping members 6 have engaged completely and the clip is closed by an instantaneous motion to hold the film F after the complete engagement of the corrugated gripping members 6.

Since other constitutions relating to the clip 55 are the same as those of the clip 2 previously described, duplicative description is omitted by providing the same numerals to the same items.

In comparison of a clip 2 in which both components have a wavy form as illustrated in FIGS. 1, 9, 10, 11, and 13 and a clip 55 in which only one component is in a wavy form and the other is in a planar form as illustrated in FIGS. 2, 14, 15, 16, and 17, there are the following advantages and disadvantages.

When both components are in a wavy form like the former one, stretching is performed while holding a film F in a wider area, the tensile force applied to the film F will become more uniform.

On the other hand, when both components are in a wavy form, wrinkles might generate on a film F if the wavy form of the film F is broken before holding the film F with the clip 2.

That is, in the preceding embodiment, the film F is shaped into a wavy form by the film-overfeeding apparatus 7 before holding the film F with the clip 2. Although it is ideal that the shaped wavy form thoroughly agrees with the shape of the clip 2, the shapes may differ slightly depending upon the thickness or the material of the film F. For example, the wavy form of a film F very rarely is broken partly as illustrated in FIG. 18A, and if the film F is pinched in such a state with a clip 2 in which both the components are in a wavy form, part of the wave is pinched duplicately as illustrated in FIG. 18B, resulting in the formation of wrinkles on the film F.

On the other hand, since a clip 2 in which only one component is in a wavy form as illustrated in FIGS. 2, 14, 15, 16, and 17 has a clearance 52 between a pushing part 47 and a film placing face 46 as depicted in FIG. 19, even if part of a wavy form is broken, the part will escape into the clearance 52, so that a situation that the film F is pinched duplicately is avoided.

In the embodiment described above, a corrugated gripping member 6 composed of a front gripping piece 6a and a back gripping piece 6b is adopted as an apparatus for sagging and corrugating a film F and the film F is shaped into a wavy form by pinching the film F with that member.

Figure 20:
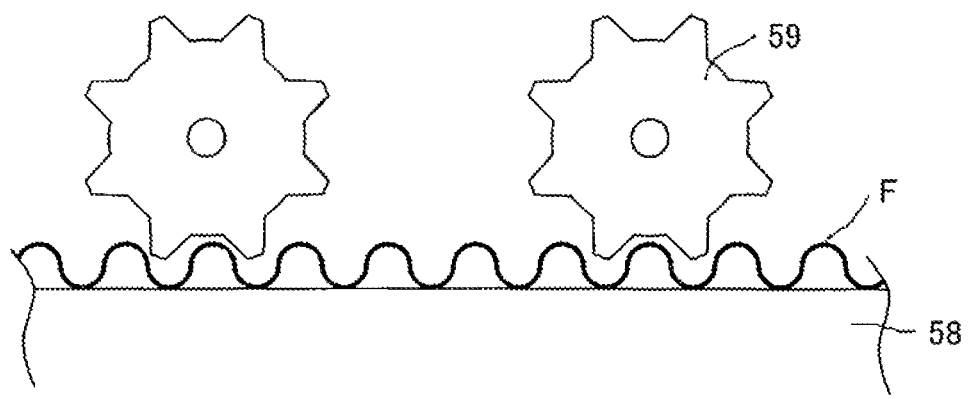
FIG. 20 is a front view illustrating a modification example of a member having projections and recesses.

However, the present invention is not restricted to this configuration, and it is also permissible, for example, to use members having projections and recesses with a structure like a rack 58 and gears 59 as illustrated in FIG. 20 and adopt a configuration of pinching a film F between the rack-like member and the gear-like members.

Figure 21:
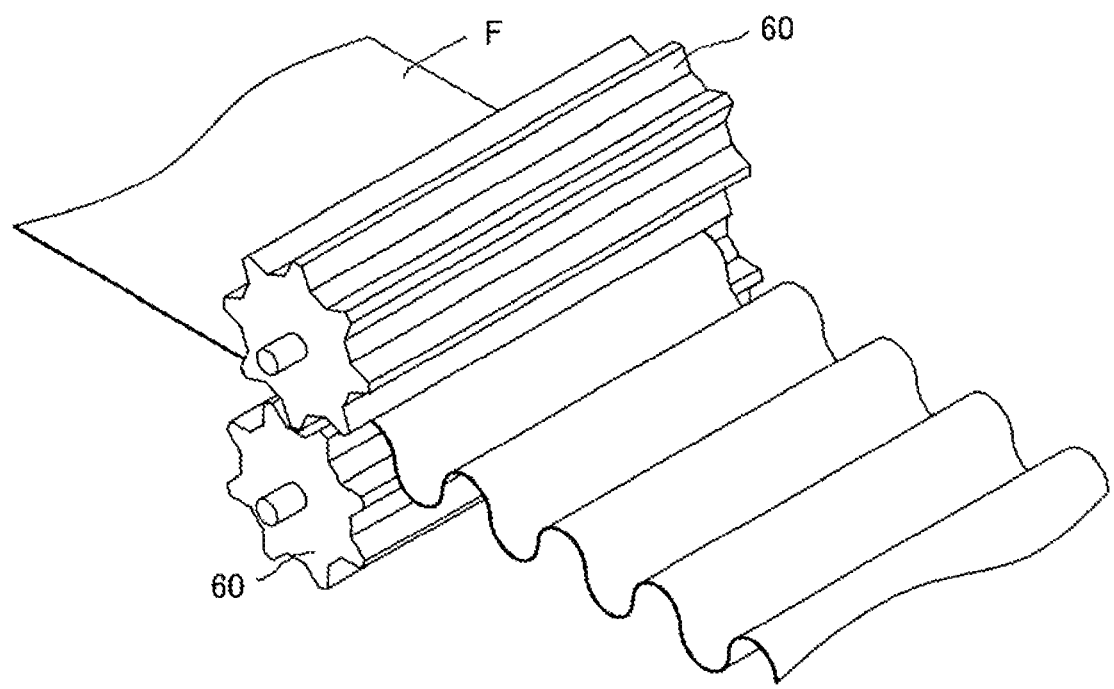
FIG. 21 is a front view illustrating another modification example of a member having projections and recesses.

It is also permissible to adopt a configuration of pinching a film F between two gear-like members (members having projections and recesses) 60 as depicted in FIG. 21.

Also by the embodiments of FIGS. 20 and 21, a film F is pushed on its both faces at intervals in the conveying direction and a partial area or the whole area of the film is sagged in the longitudinal direction.

Although a configuration in which the film-overfeeding apparatus 7 has corrugated gripping members (a front gripping piece and a back gripping piece) 6a and 6b and a film F is pinched with the corrugated gripping members 6a and 6b is adopted in the above-described embodiment, it is also permissible to provide a block 61 having only one projection and a film F is pushed on both faces with this type of blocks 61.

Figure 22:
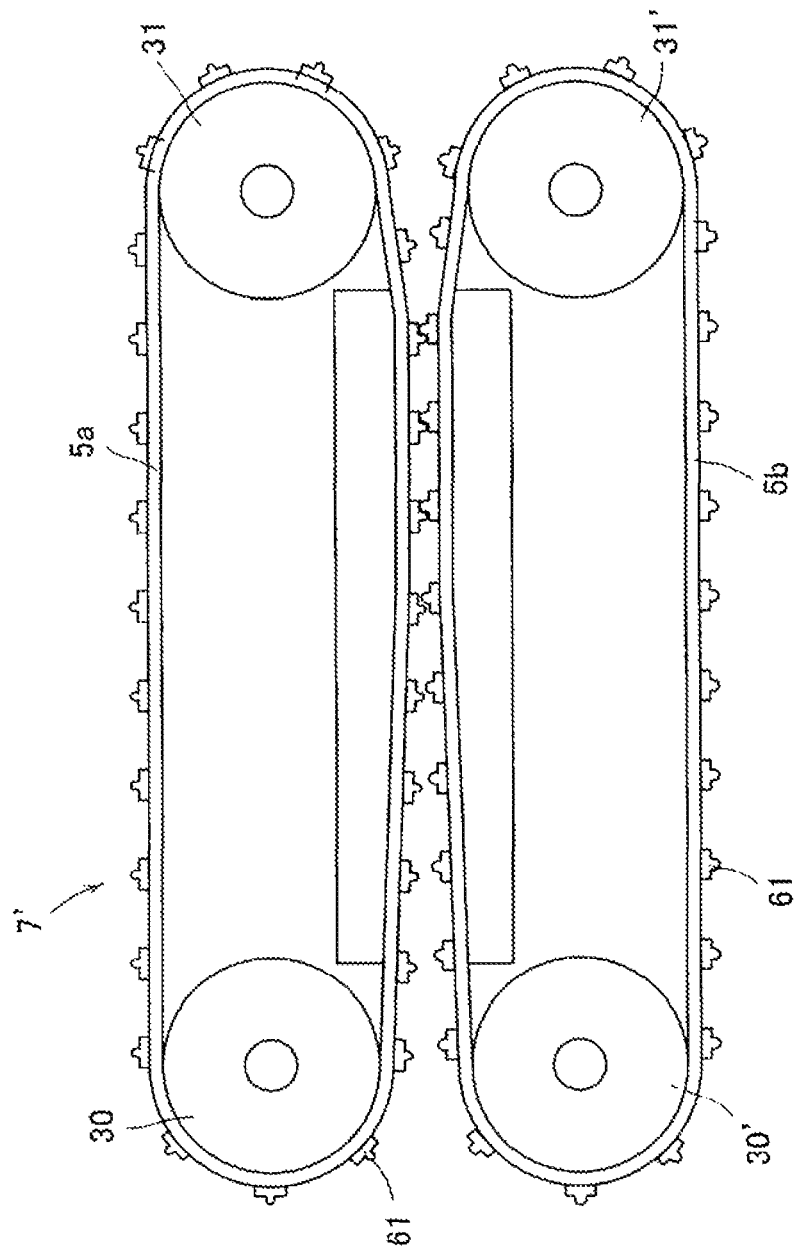
FIG. 22 is a side view illustrating a modification example of feeder chains and corrugated gripping members.

Also by the embodiment of FIG. 22, a film F is pushed on its both faces at intervals in the conveying direction and a partial area or the whole area of the film is sagged in the longitudinal direction.

Figure 23A:
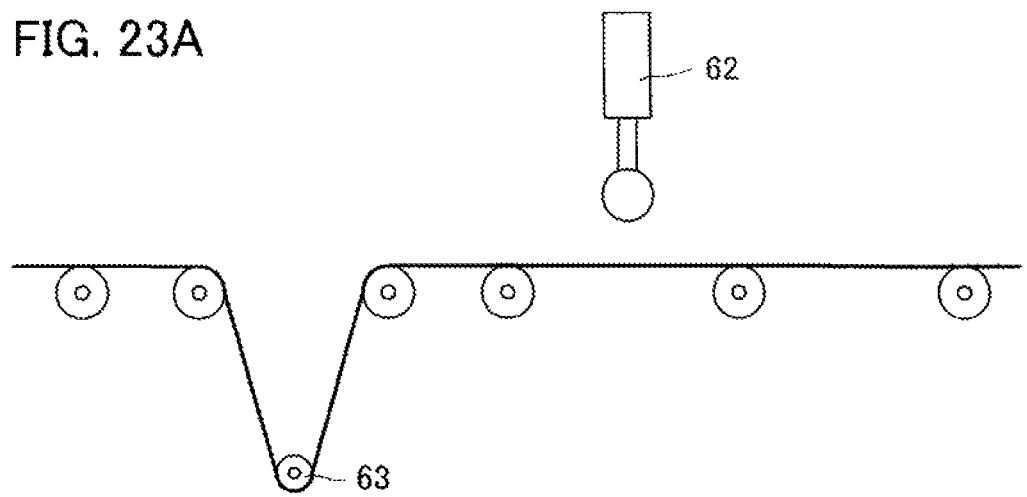
FIGS. 23A to 23C are each a conceptual illustration showing a modification example of a method of corrugating a film F.
Figure 23B:
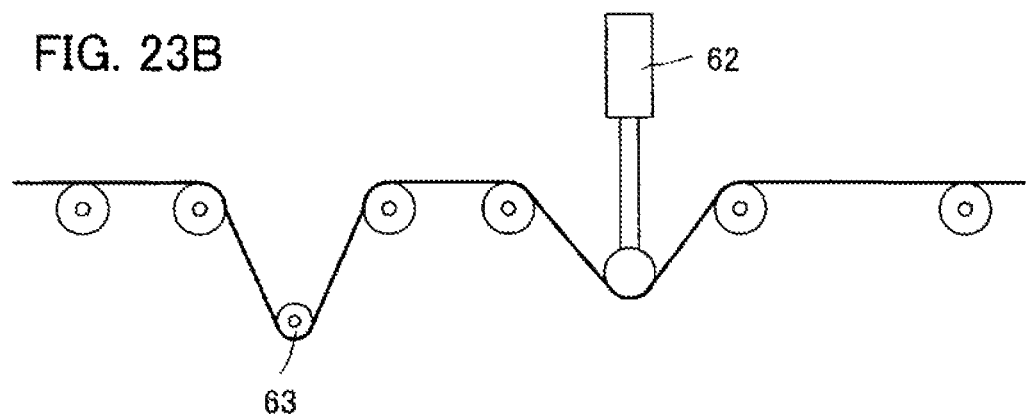
Figure 23C:
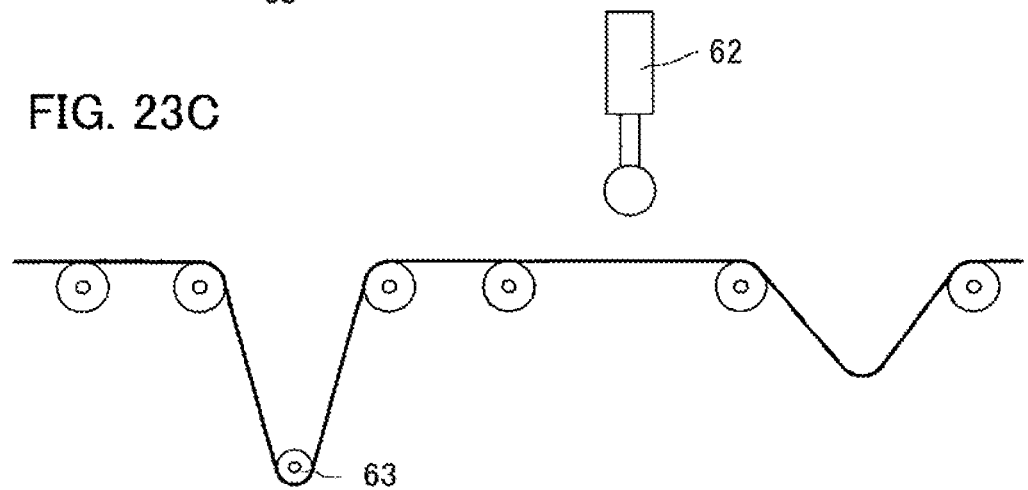

It is also permissible to push a surface of a film F with a cylinder 62 without using a chain. FIGS. 23A to 23C show a configuration of pushing a surface of a film F with a cylinder 62.

In the configuration shown in FIGS. 23A to 23C, a dancer roll 63 is disposed in the conveyance path of the film F and the film F below the cylinder 62 has a degree of freedom in the conveying direction with respect to conveying means (not shown). That is, the film F has been given a certain tension by a roll (dancer roll 63) provided in such a manner that it can freely move upwardly and downwardly. Since the dancer roll 63 has a degree of freedom in the up-and-down direction, if the film F is pulled in the direction of travel under the application of an external force, the dancer roll 63 will rise as depicted in FIG. 23B to pay out the film F toward the downstream side.

In this embodiment, if a surface of the film F is pushed with the cylinder 62 as shown in FIG. 23B, the dancer roll 63 will rise and the film F will be paid out to sag. The cylinder 62 rise and fall at fixed intervals and the film F is pushed on its front face at intervals in the conveying direction, so that a partial area or the whole area of the film is sagged in the longitudinal direction.

It is also permissible to corrugate a film F by pinching it with a clip (holding member) 2 without using a film-overfeeding apparatus 7.

Figure 24A:
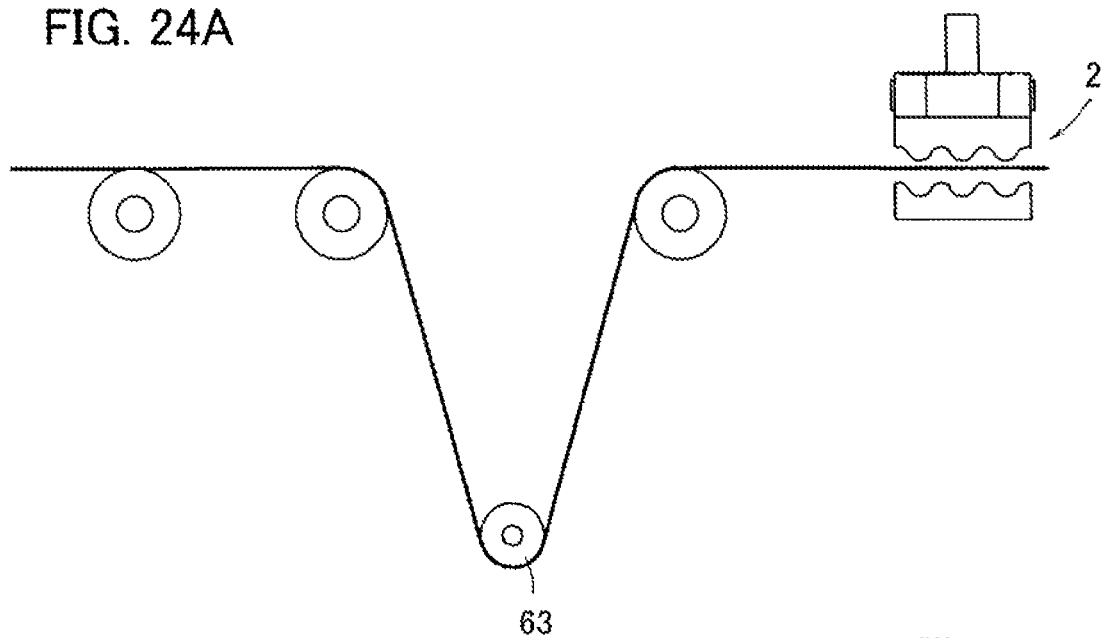
FIGS. 24A and 24B are each a conceptual illustration showing another modification example of a method of corrugating a film F.
Figure 24B:
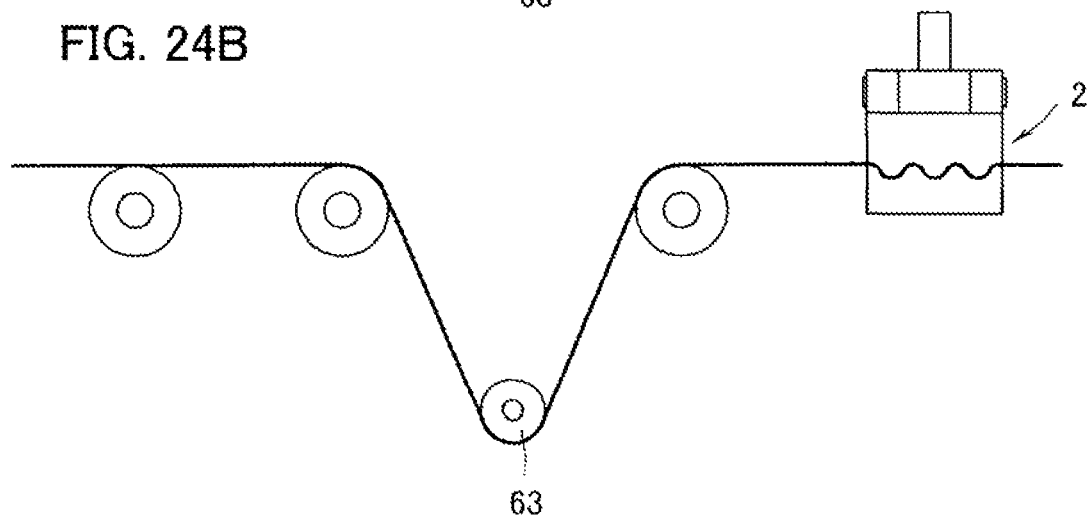

When the film F is corrugated by pinching the film F with a clip (holding member) 2, it is preferable to provide a degree of freedom to the film F in the conveying direction by disposing the dancer roll 63 in the conveyance path of the film F as illustrated in FIG. 24.

Another possible method for corrugating (sagging) a film F is a method of feeding the film F excessively. For example, as shown in FIG. 25, a plurality of conveying devices 75 are disposed and a film F is conveyed in the direction of the arrow by these conveying devices 75. A conveying speed of a roll is adjusted to be lower than that of a roll immediately upstream of the roll. As a result, the film F corrugates gradually as shown in FIG. 25.

Because a stretched film produced by the production method described above is a long film stretched in the transverse direction, it is possible to produce a retardation sheet 63 with an optical compensation film by laminating the film to a long polarizing plate as shown in FIG. 26.

The stretched film F produced by the present production method has been wound in a roll form.

On the other hand, the long polarizing plate also has been wound in a roll form. Generally, a polarizing plate is a film produced by laminating a long TAC (triacetyl cellulose) film and a longitudinally-stretched long PVA (polyvinyl alcohol) film.

From a roll 70 of a transversely-stretched long film F and a roll 71 of a long polarizing plate 66 are paid out the film F and the plate 66, respectively, as illustrated in FIG. 26, and the film F and the plate 66 are traveled one above another in parallel and pinched between a pair of pressing rolls 72. When a release paper has been laminated to the stretched film F or the long polarizing plate, the release paper is removed during the operations and an adhesive is applied to one of the film F and the plate 66, if necessary.

According to this method, it is possible to continuously produce a retardation sheet with an optical compensation film in which the transversely-stretched film F has been laminated to the polarizing plate 66.

The retardation compensation film produced by the method of FIG. 26 exhibits a small Nz coefficient at any position and, specifically, exhibits an Nz coefficient of 1.4 or less at any position. If production is performed by the method of FIG. 26, it is possible to make the Nz coefficient be 1.2 or less at any position and if conditions are adjusted well, it is possible to make the Nz coefficient be 1.1 or less at any position.

EXAMPLES

The present invention will be illustrated specifically below with reference to examples, but the examples do not limit the invention.

Experiment 1

(2) Example 1

Example 1-1 to Example 1-3

By using the clip depicted in FIG. 2, the stretching machine depicted in FIG. 3, and the film-overfeeding apparatus depicted in FIGS. 4 to 5, a polycarbonate film having a width of 600 mm and a thickness of 60 μm was stretched in a direction transverse to the conveying direction at 150° C. The precursor film used in the experiment was "ELMECH R-film unstretched" (produced by Kaneka Corporation).

The results are set forth in Table 1. In this example, changing the biting depth of a front gripping piece 6a and a back gripping piece 6b was also tried by changing the interval between the corrugated gripping members (the front gripping piece 6a and the back gripping piece 6b) in FIG. 5. Regarding the biting depth of the front gripping piece 6a and the back gripping piece 6b, only rough estimation is indicated in Table 1.

The phase difference value is also referred to as a retardation value and it is the difference of phase in two different directions for a polarized light ray which had passed through an anisotropic crystal. The value is normalized by the measured wavelength (550 nm) and is expressed in a unit of length.

Whether a film F was stretched selectively in the transverse direction or not was judged by measuring an Nz coefficient. If the Nz coefficient is around 1, the film F has been stretched selectively in the transverse direction, whereas when the film has been stretched in the longitudinal direction as well as in the transverse direction, the Nz coefficient is a value which is far from 1.

Square samples of 50 mm on each side were cut out from the film. The samples were cut out from three positions; namely, one sample was taken from the center in the width direction and two samples were taken from positions which were 200 mm away to the right or the left, respectively, from the center. Since the with of the film was 600 mm, the "positions which were 200 mm away to the right or the left, respectively, from the center" were positions which were 100 mm away toward the center from both side edges.

By using an automatic refractometer (product name: KOBRA-WR, manufactured by Oji Scientific Instruments), birefringence values nx, ny, and nz, and an in-plane retardation Re (nm) were measured. The measured wavelength was 550 nm, which was common in all the examples and comparative examples. The thickness of samples was measured by an electronic micrometer manufactured by Anritsu Corporation.

The measuring instruments and the measuring conditions were common in all the following examples and comparative examples.

The phase difference value (in-plane phase difference) in Table 1 is an average of the measurements of the three positions. The Nz coefficients in Table 1 are measured values of one point in each position (center, left, right).

The Nz coefficients were calculated by substituting the birefringence values nx, ny, and nz measured with the above-mentioned automatic refractometer (product name: KOBRA-WR, manufactured by Oji Scientific Instruments) into the following formula.

$$Nz = (nx - nz)/(nx - ny) \quad \text{Formula 1}$$

(2) Comparative Example 1

Comparative Example 1-1 and Comparative Example 1-2

Comparative Example 1 is an example of failing to use the film-overfeeding apparatus. As Comparative Example 1, a polycarbonate film was stretched in a direction transverse to the conveying direction without sagging the film and without using the film-overfeeding apparatus and the clip of the present invention.

The precursor film F used in Comparative Example 1 was the same as that of Example 1 described above, namely, "ELMECH R-film unstretched" (produced by Kaneka Corporation).

(3) Difference of Example 1 and Comparative Example 1

Table 1 shows that when the clip and the film-overfeeding apparatus of the present invention were used (Example 1), the Nz coefficients were 0.96 to 1.38 and the films were stretched in the transverse direction with selectivity.

On the other hand, it is found that when stretching was performed without using the film-overfeeding apparatus or the clip of the present invention (comparative example), the Nz coefficients were 1.51 to 1.60 and the films were stretched in the longitudinal direction as well as in the transverse direction.

Comparing the phase difference values at the same stretching ratio in Example 1 and Comparative Example 1, the example exhibited a greater phase difference value. This is probably because, although a retardation was developed by being stretched in the transverse direction in the example, the developed retardation was canceled by being stretched also in the longitudinal direction in the comparative example. This also shows that the film was stretched selectively in the transverse direction in the example.

It is also found that it is possible to change the phase difference value or the Nz coefficient by changing the biting depth of the engaging members of the film-overfeeding apparatus.

TABLE 1

| | Stretching ratio | Biting depth of corrugated gripping members | Phase difference value (nm) | Nz coefficient Left | Nz coefficient Center | Nz coefficient Right |
|---|---|---|---|---|---|---|
| Example 1-1 | 1.5 | Deep | 887 | 1.16 | 1.17 | 1.15 |
| Example 1-2 | 1.3 | Deep | 675 | 0.96 | 1.04 | 1.03 |
| Example 1-3 | 1.5 | Shallow | 721 | 1.36 | 1.35 | 1.38 |
| Example 1-4 | 1.3 | Shallow | 607 | 1.03 | 1.04 | 1.07 |
| Comparative Example 1-1 | 1.5 | None | 632 | 1.58 | 1.51 | 1.58 |
| Comparative Example 1-2 | 1.3 | None | 475 | 1.60 | 1.51 | 1.60 |

Experiment 2

(1) Example 2

Example 2-1 and Example 2-2

By using the clip depicted in FIG. 2, the stretching machine depicted in FIG. 3, and the film-overfeeding apparatus depicted in FIGS. 4 to 5, a norbornene-based resin having a film width of 600 mm and a film thickness of 60 μm was stretched in a direction transverse to the conveying direction at 140° C. The precursor film F used in the experiment was "ZEONOR Z F14" (produced by Optes Co., Ltd.).

The results are shown in Table 2.

Whether the film F was stretched selectively in the transverse direction or not was judged by measuring an Nz coefficient. If the Nz coefficient is around 1, the film F has been stretched selectively in the transverse direction, whereas when the film has been stretched in the longitudinal direction as well as in the transverse direction, the Nz coefficient is a value which is far from 1.

(2) Comparative Example 2

Comparative Example 2-1 and Comparative Example 2-2

There are also provided the results obtained by, as a comparative example, stretching the film F in a direction transverse to the conveying direction without sagging the film and without using the film-overfeeding apparatus.

(3) Difference of Example 2 and Comparative Example 2

Table 2 shows that when the clip and the film-overfeeding apparatus of the present invention were used (Example 2), the Nz coefficients were 1.14 to 1.33 and the films were stretched in the transverse direction selectively. On the other hand, it is found that when stretching was performed without using the film-overfeeding apparatus or the clip of the present invention (Comparative Example 2), the Nz coefficients were 1.37 to 1.59 and the films were stretched in the longitudinal direction as well as in the transverse direction.

Comparing the phase difference values at the same stretching ratio in Example 2 and Comparative Example 2, the example exhibited a greater phase difference value. This is probably because, although a retardation was developed by being stretched in the transverse direction in the example, the developed retardation was canceled by being stretched also in the longitudinal direction in the comparative example. This also shows that the film was stretched selectively in the transverse direction in the example.

TABLE 2

| | Stretching ratio | Biting depth of corrugated gripping members | Phase difference value (nm) | Nz coefficient | | |
|---|---|---|---|---|---|---|
| | | | | Left | Center | Right |
| Example 2-1 | 1.5 | Deep | 157 | 1.2 | 1.14 | 1.19 |
| Example 2-2 | 1.3 | Deep | 79 | 1.33 | 1.32 | 1.27 |
| Comparative Example 2-1 | 1.5 | None | 102 | 1.43 | 1.37 | 1.42 |
| Comparative Example 2-2 | 1.3 | None | 72 | 1.57 | 1.52 | 1.59 |

The invention claimed is:

1. A method for producing a stretched film, comprising
conveying a continuously fed film in a conveying direction while pinching both side edges of the film with holding members, and
a stretching step comprising stretching the film in a direction transverse to the conveying direction while increasing a distance between the holding members of both the side edges while conveying the film, and
a sagging step wherein a partial area or a whole area of the film is sagged by pinching the film between pinching members having projections and recesses, so as to generate a sagged film having ridges and grooves extending longitudinally in a direction perpendicular to the conveying direction, and the film is stretched in the traverse direction while the film is sagged in the conveying direction,
wherein at least a portion of the film is instantaneously sagged by the sagging step and stretched by the stretching step.

2. The method for producing a stretched film according to claim 1,
wherein the pinching members having projections and recesses are corrugated gripping members in a staggered configuration, folding the film between the projections and recesses in a sagged status in the conveying direction, and
the corrugated gripping members are to form a clearance greater than the thickness of the film when the members are engaged with each other.

3. The method for producing a stretched film according to claim 1, wherein the sagging step comprises a film-overfeed apparatus that has a corrugated gripping member having a front gripping piece and a back gripping piece, wherein the front gripping piece and the back gripping piece each have projections for generating sagged film, the projections for generating sagged film of the front and back gripping pieces are located at staggered positions in the conveying direction of a film, the projections for generating sagged film are in an engaged state when the front gripping piece and the back gripping piece are close to each other, the front gripping piece and the back gripping piece are disposed oppositely on the front side and the back side of a film, respectively, and the corrugated gripping member pinches a film between the front and back gripping pieces to sag the film while moving in the conveying direction of the film.

4. The method for producing a stretched film according to claim 1, wherein the sagging step comprises a film-overfeed apparatus provided with corrugated gripping members that are disposed oppositely on the front and back sides of a film and that pinch the film while moving in the conveying direction of the film, and
the corrugated gripping members are arranged along the conveying direction of the film and each have projections for generating sagged film in a staggered configuration so as to stretch the film in the width direction.

5. The method for producing a stretched film according to claim 1,
further comprising a sampling step of taking at least three sampled pieces,
wherein the stretched film is of 600 mm or more in width,
wherein one of the three sample pieces is taken at a position located on a center line of the stretched film, another one of the three sample pieces is taken at a position 100 mm away from a side edge of the stretched film, and a last one of the three sample pieces is taken at a position 100 mm away from the other side edge of the stretched film,
wherein each of the three sample pieces has an Nz coefficient of 1.4 or less.

6. The method for producing a stretched film according to claim 1,
further comprising a step of sagging the partial area or the whole area of the film by pushing one face and the other face of the film in an alternate arrangement before stretching the film in the direction transverse to the conveying direction.

7. The method for producing a stretched film according to claim 1,
further comprising laminating at least two stretched films into a seamless film,
wherein the stretched film is of 600 mm or more in width,
wherein stretching directions of the two stretched films intersect; and
wherein Nz coefficients of the two stretched films are 1.4 or less at any position.

8. A method for producing a stretched film, comprising
conveying a continuously fed film in a conveying direction while holding both side edges of the film, and
stretching the film in a direction transverse to the conveying direction while conveying the film,
wherein the method includes
a sagging step of folding both side edges of the film with pinching members having projections and recesses, so as to generate a sagged film having ridges and grooves extending longitudinally in a direction perpendicular to the conveying direction,
a holding step of holding both the side edges of the sagged film on a conveyor, and
a stretching step of stretching the sagged film in the transverse direction by widening the sagged film in the transverse direction while conveying the sagged film by the conveyor,
wherein at least a portion of the sagged film is instantaneously sagged by the sagging step and stretched by the stretching step.

9. The method for producing a stretched film according to claim 8, wherein the holding step is a step of pinching with a plurality of holding members having pieces that move close to and away from each other.

10. The method for producing a stretched film according to claim 9, wherein each of the plurality of holding members is a member that has a pair of holding member pieces and that pinches an edge of a film between the holding member pieces and the pair of holding member pieces each have projections and recesses.

11. The method for producing a stretched film according to claim 9, wherein each of the plurality of holding members is a member that has a pair of holding member pieces and that pinches an edge of a film between the holding member pieces and one of the pair of holding member pieces has projections and recesses and the other has a planar form.

12. A method for producing a stretched film, comprising
conveying a long film in a conveying direction along a longitudinal direction of the film, and
a stretching step comprising stretching the film in a direction transverse to the conveying direction while conveying the film, and
a sagging step so as to generate a sagged film,
wherein the stretching in the transverse direction starts with a partial area or the whole area of the film sagged beforehand in the longitudinal direction, wherein at least a portion of the film is instantaneously sagged by the sagging step and stretched by the stretching step,
wherein the film remains sagged in the longitudinal direction when stretched,
wherein the stretching in the transverse direction is started with at least one edge of the film gripped by a holding member that has at least one holding member piece having projections and recesses, so as to generate ridges and grooves extending longitudinally in a direction perpendicular to the conveying direction.

13. The method for producing a stretched film according to claim 12, wherein the partial area or the whole area of the film is sagged beforehand in the longitudinal direction by pushing at least one face of the film at intervals in the conveying direction.

14. The method for producing a stretched film according to claim 12, wherein the partial area or the whole area of the film is sagged beforehand in the longitudinal direction by pushing one face and the other face of the film in an alternate arrangement.

15. The method for producing a stretched film according to claim 12, wherein the partial area or the whole area of the film is sagged beforehand by pushing the film by folding the film between pinching members each having projections and recesses.

16. The method for producing a stretched film according to claim 12, wherein the partial area or the whole area of the film is sagged beforehand in the longitudinal direction by pushing a central portion in the width direction of the film.

17. The method for producing a stretched film according to claim 14, wherein the long film is conveyed by a conveyor and the partial area or the whole area of the long film is sagged so as to be corrugated while the film is kept to have a degree of freedom in the conveying direction with respect to the conveyor.

18. The method for producing a stretched film according to claim 14, wherein both side edges of the film are held with the partial area or the whole area of the film having been sagged beforehand and the film is stretched in a direction transverse to the conveying direction while the film is conveyed in the longitudinal direction.

* * * * *